United States Patent
Cheng et al.

(10) Patent No.: US 8,754,846 B2
(45) Date of Patent: Jun. 17, 2014

(54) INDICATION POSITION CALCULATION SYSTEM, INDICATOR FOR INDICATION POSITION CALCULATION SYSTEM, GAME SYSTEM, AND INDICATION POSITION CALCULATION METHOD

(75) Inventors: Chiu Hao Cheng, Jhonghe (TW); Shing Lung Tai, Taipei (KR); Tatsuji Kumabayashi, Hadano (JP)

(73) Assignees: Namco Bandai Games Inc., Tokyo (JP); Zeroplus Technology Co., Ltd., Taipei (TW); Shang Hwang Industry Co., Ltd., Taipei (TW); Tatsuji Kumabayashi, Hadano (JP)

( * ) Notice: Subject to any disclaimer, the term of this patent is extended or adjusted under 35 U.S.C. 154(b) by 1446 days.

(21) Appl. No.: 12/068,820

(22) Filed: Feb. 12, 2008

(65) Prior Publication Data

US 2008/0198129 A1 Aug. 21, 2008

(30) Foreign Application Priority Data

Feb. 15, 2007 (JP) .................................. 2007-35228

(51) Int. Cl.
*A63F 9/02* (2006.01)
*G09G 5/00* (2006.01)

(52) U.S. Cl.
USPC ............................................ 345/156; 463/51

(58) Field of Classification Search
USPC ......... 345/156–184; 178/18.01–20.04; 463/7, 463/37, 36, 39, 53, 54, 49, 50, 51; 382/106, 382/312, 313
See application file for complete search history.

(56) References Cited

U.S. PATENT DOCUMENTS

| | | | | |
|---|---|---|---|---|
| 4,183,013 A | * | 1/1980 | Agrawala et al. | 382/173 |
| 5,741,185 A | * | 4/1998 | Kwan et al. | 463/51 |
| 6,144,366 A | * | 11/2000 | Numazaki et al. | 345/156 |
| 6,146,278 A | * | 11/2000 | Kobayashi | 463/53 |
| 8,290,214 B2 | * | 10/2012 | Kuo et al. | 382/106 |
| 2007/0060384 A1 | * | 3/2007 | Dohta | 463/43 |

FOREIGN PATENT DOCUMENTS

| | | |
|---|---|---|
| EP | 0 728 503 A1 | 8/1996 |
| EP | 1 666 919 A2 | 6/2006 |
| JP | A 10-249065 | 9/1998 |
| JP | B2 2961097 | 7/1999 |

OTHER PUBLICATIONS

U.S. Appl. No. 12/068,820, filed Feb. 12, 2008, Kuo et al.

* cited by examiner

*Primary Examiner* — Alexander Eisen
*Assistant Examiner* — Patrick F Marinelli
(74) *Attorney, Agent, or Firm* — Oliff PLC

(57) ABSTRACT

An imaging section successively outputs light-reception information relating to each pixel from a starting pixel SP to an end pixel EP, the starting pixel SP being provided on one end of an image PC acquired by the imaging section and the end pixel EP being provided on the other end of the image PC. The imaging section is provided in an indicator so that the starting pixel SP is disposed on a lower side and the end pixel EP is disposed on an upper side when the indicator is held in a reference position.

12 Claims, 14 Drawing Sheets

INDICATION POSITION CALCULATION SYSTEM, INDICATOR FOR INDICATION POSITION CALCULATION SYSTEM, GAME SYSTEM, AND INDICATION POSITION CALCULATION METHOD

Japanese Patent Application No. 2007-35228, filed on Feb. 15, 2007, is hereby incorporated by reference in its entirety.

BACKGROUND OF THE INVENTION

The present invention relates to an indication position calculation system, an indicator for an indication position calculation system, a game system, and an indication position calculation method.

An indication position calculation system has been known which calculates an indication position of an indicator on an indication plane (e.g., monitor or screen), such as a shooting game system using a gun-type controller or a presentation system using a pointing device. In such an indication position calculation system, an infrared light source or the like is disposed near the indication plane. The light source is imaged using an image sensor (light-receiving sensor) provided on the end of the indicator, and the indication position of the indicator is calculated based on the position of the light-emitting section in the resulting image.

In such an indication position calculation system, accurate position calculations cannot be performed when the image sensor receives light (noise) other than light from the light source. A related-art indication position calculation system determines whether the light detected by the image sensor is light from the light source or noise based on the length and the size of the light reception area detected by the image sensor. Japanese Patent No. 2961097 discloses such technology, for example.

According to a related-art indication position calculation system, since the processing load increases to determine whether the light detected by the image sensor is light from the light source or noise, the indication position calculation speed decreases. Therefore, when the user of the system changes the direction of the indicator at high speed, the calculation speed cannot follow the change in direction, whereby an accurate indication position cannot be provided to the user.

SUMMARY

According to a first aspect of the invention, there is provided an indication position calculation system calculating an indication position of an indicator, the indication position calculation system comprising:

a light-emitting section;

an imaging section which is provided in the indicator, acquires an image and successively outputs light-reception information of pixels of the acquired image, wherein one of the pixels having the light-reception information output primarily is disposed on a lower side of the image and another one of the pixels having the light-reception information output last is disposed on an upper side of the image when the indicator is held in a reference position;

a determination section which determines whether or not the pixels are effective pixels satisfying a given condition based on the light-reception information; and a calculation section which performs position calculations based on identification information of the effective pixels in order to obtain the indication position of the indicator when light received by the effective pixels is included in light emitted from the light-emitting section, the calculation section performing the position calculations based on the identification information of a first effective pixel which is one of the effective pixels and is primarily determined to satisfy the given condition.

According to a second aspect of the invention, there is provided an indicator for an indication position calculation system, the indicator comprising:

an imaging section which acquires an image of a light emitting section and successively outputs light-reception information of pixels of the acquired image;

a determination section which determines whether or not the pixels are effective pixels satisfying a given condition based on the light-reception information; and a calculation section which performs position calculations based on identification information of the effective pixels in order to obtain an indication position of the indicator when light received by the effective pixels is included in light emitted from the light-emitting section, the calculation section performing the position calculations based on the identification information of a first effective pixel which is one of the effective pixels and is primarily determined to satisfy the given condition; and the imaging section being provided in the indicator held in a reference position when one of the pixels having the light-reception information output primarily is disposed on a lower side of the image and another one of the pixels having the light-reception information output last is disposed on an upper side of the image.

According to a third aspect of the invention, there is provided a game system calculating an indication position of an indicator, the game system comprising:

a display section which displays an object;

a light-emitting section which has a given positional relationship with the display section;

an imaging section which is provided in the indicator, acquires an image and successively outputs light-reception information of pixels of the acquired image, wherein one of the pixels having the light-reception information output primarily is disposed on a lower side of the image and another one of the pixels having the light-reception information output last is disposed on an upper side of the image when the indicator is held in a reference position;

a determination section which determines whether or not the pixels are effective pixels satisfying a given condition based on the light-reception information; and a calculation section which performs position calculations based on identification information of the effective pixels in order to obtain the indication position of the indicator when light received by the effective pixels is included in light emitted from the light-emitting section, the calculation section performing the position calculations based on the identification information of a first effective pixel which is one of the effective pixels and is primarily determined to satisfy the given condition.

According to a fourth aspect of the invention, there is provided an indication position calculation method comprising:

causing an imaging section provided in an indicator to acquire an image of a light emitting section and successively output light-reception information of pixels of the acquired image;

causing a determination section to determine whether or not the pixels are effective pixels satisfying a given condition based on the light-reception information; and causing a calculation section to perform position calculations based on identification information of the effective pixels in order to obtain an indication position of the indicator when light received by the effective pixels is included in light emitted from the light-emitting section, the calculation section performing the position calculations based on the identification information of a first effective pixel which is one of the effective pixels and is primarily determined to satisfy the given condition; and the imaging section being provided in the indicator held in a reference position when one of the pixels having the light-reception information output primarily is disposed on a lower side of the image and another one of the pixels having the light-reception information output last is disposed on an upper side of the image.

DETAILED DESCRIPTION OF THE EMBODIMENT

Figure 1:
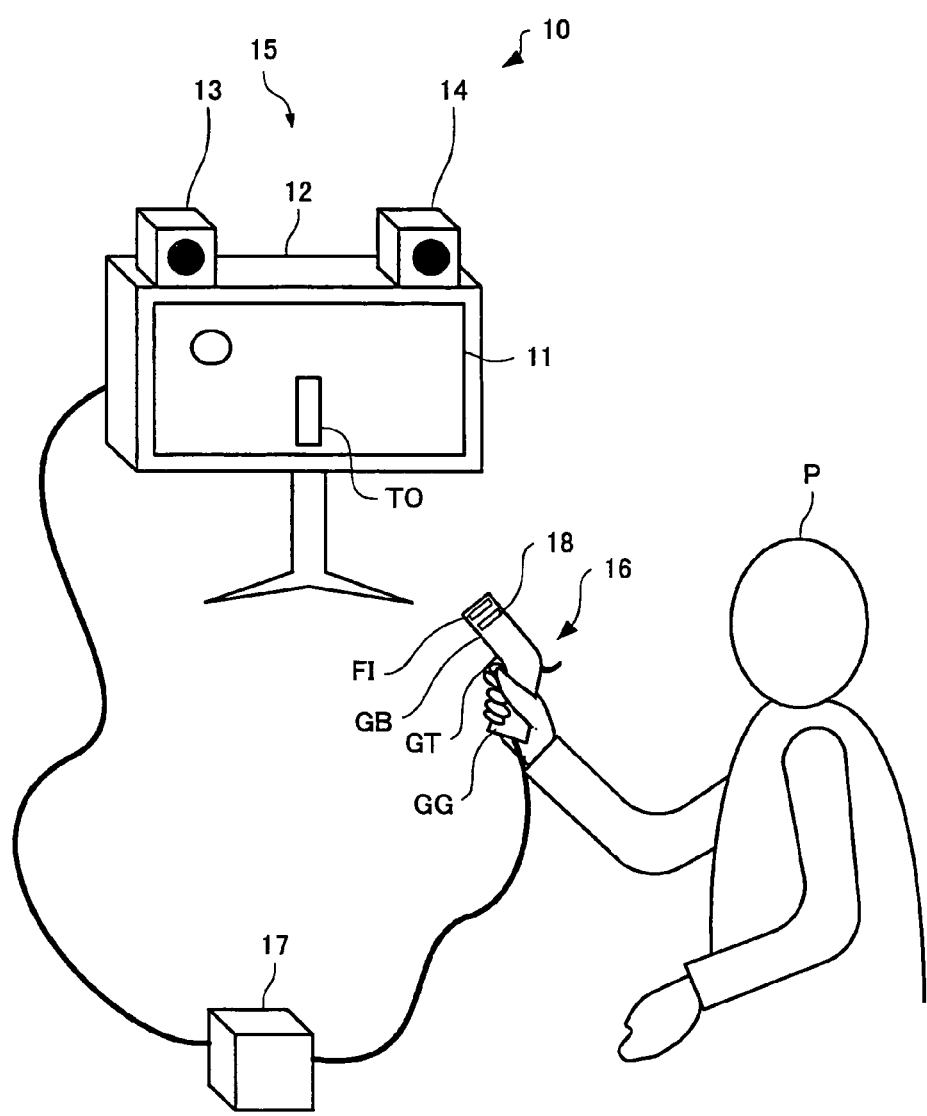
FIG. 1 is a diagram schematically showing an example of the appearance of a system according to one embodiment of the invention.

The invention may provide an indication position calculation system, an indicator for an indication position calculation system, a game system, and an indication position calculation method capable of promptly and accurately calculating an indication position with a reduced processing load.

(1) According to one embodiment of the invention, there is provided an indication position calculation system calculating an indication position of an indicator, the indication position calculation system comprising:

a light-emitting section;

an imaging section which is provided in the indicator, acquires an image and successively outputs light-reception information of pixels of the acquired image, wherein one of the pixels having the light-reception information output primarily is disposed on a lower side of the image and another one of the pixels having the light-reception information output last is disposed on an upper side of the image when the indicator is held in a reference position;

a determination section which determines whether or not the pixels are effective pixels satisfying a given condition based on the light-reception information; and a calculation section which performs position calculations based on identification information of the effective pixels in order to obtain the indication position of the indicator when light received by the effective pixels is included in light emitted from the light-emitting section, the calculation section performing the position calculations based on the identification information of a first effective pixel which is one of the effective pixels and is primarily determined to satisfy the given condition.

According to one embodiment of the invention, there is provided an indicator for an indication position calculation system, the indicator comprising:

an imaging section which acquires an image of a light emitting section and successively outputs light-reception information of pixels of the acquired image;

a determination section which determines whether or not the pixels are effective pixels satisfying a given condition based on the light-reception information; and a calculation section which performs position calculations based on identification information of the effective pixels in order to obtain an indication position of the indicator when light received by the effective pixels is included in light emitted from the light-emitting section, the calculation section performing the position calculations based on the identification information of a first effective pixel which is one of the effective pixels and is primarily determined to satisfy the given condition; and the imaging section being provided in the indicator held in a reference position when one of the pixels having the light-reception information output primarily is disposed on a lower side of the image and another one of the pixels having the light-reception information output last is disposed on an upper side of the image.

According to one embodiment of the invention, there is provided an indication position calculation method comprising:

causing an imaging section provided in an indicator to acquire an image of a light emitting section and successively output light-reception information of pixels of the acquired image;

causing a determination section to determine whether or not the pixels are effective pixels satisfying a given condition based on the light-reception information; and causing a calculation section to perform position calculations based on identification information of the effective pixels in order to obtain an indication position of the indicator when light received by the effective pixels is included in light emitted from the light-emitting section, the calculation section performing the position calculations based on the identification information of a first effective pixel which is one of the effective pixels and is primarily determined to satisfy the given condition; and the imaging section being provided in the indicator held in a reference position when one of the pixels having the light-reception information output primarily is disposed on a lower side of the image and another one of the pixels having the light-reception information output last is disposed on an upper side of the image.

The term "identification information of a pixel" used herein refers to information which specifies the position of a pixel in an image. For example, the identification information may be address data or a count value of a pixel. The term "reference position" used herein refers to a predetermined position (direction or position) of the indicator (i.e., position at which the starting pixel of the imaging section provided in the indicator is positioned on the lower side and the end pixel is positioned on the upper side). The reference position may be appropriately determined depending on the specification of the indication position calculation system and the specification of the indicator. The reference position of the indicator may be an average position when using the indicator in a normal state. The term "normal state" used herein refers to a state determined based on the shape of the indicator or a state specified in a manual or the like, for example.

According to the above embodiments, when the user of the system directs the indicator toward the light-emitting section, the imaging section provided in the indicator acquires an image in a given area including the light-emitting section. The determination section determines whether or not each pixel satisfies a given condition based on the light-reception information relating to each pixel, and the calculation section calculates the indication position of the indicator based on the positions of the effective pixels in the image using the effective pixels which satisfy a given condition as pixels corresponding to the light-emitting section.

When pixels corresponding to noise exist, the indication position cannot be accurately calculated if the position calculations are performed using the pixels corresponding to noise as pixels corresponding to the light-emitting section without determining whether or not the effective pixel is a pixel corresponding to the light-emitting section or a pixel corresponding to noise.

In an actual situation in which the above indication position calculation system is installed, a noise source generally exists at a position above the light-emitting section. For example, when using an infrared light source as the light-emitting section, a window through which external light enters or an incandescent lamp may serve as an infrared light source (i.e., noise source). A window or a lamp generally exists at a position higher than the light-emitting section. Therefore, pixels corresponding to noise generally occur in an area higher than the light-emitting section in the image acquired by the imaging section. On the other hand, pixels corresponding to noise rarely occur in an area lower than the light-emitting section.

The above embodiments focuses on this situation. Specifically, the imaging section is provided in the indicator so that the starting pixel is disposed on the lower side and the end pixel is disposed on the upper side when the indicator is held in the reference position. The imaging section successively outputs the light-reception information relating to each pixel from the starting pixel which corresponds to the lower side of the image acquired by the imaging section. Specifically, when the indicator is held in the reference position, the imaging section successively outputs the light-reception information relating to each pixel from the pixels positioned on the lower side in which pixels corresponding to noise rarely occur.

According to the above embodiments, since the first effective pixel of which the light-reception information has been output from the imaging section and which has been determined to satisfy a given condition is considered to be a pixel corresponding to the light-emitting section, the indication position can be accurately calculated using the first effective pixel as a pixel corresponding to the light-emitting section without determining whether the first pixel is a pixel corresponding to the light-emitting section or a pixel corresponding to noise. According to the above embodiments, since it is unnecessary to determine whether the effective pixel which satisfies a given condition is a pixel corresponding to the light-emitting section or a pixel corresponding to noise, the indication position can be promptly and accurately calculated with a reduced processing load.

(2) In each of the indication position calculation system, the indicator for an indication position calculation system, and the indication position calculation method, the calculation section may set a predetermined area of the image including the first effective pixel as a determination area, and perform the position calculations based on the identification information of part of the effective pixels included in the determination area.

According to this feature, effective pixels included in the predetermined determination area can be considered to be pixels corresponding to the light-emitting section. Therefore, the indication position can be more accurately calculated using the identification information relating to the effective pixels included in the predetermined determination area.

(3) Each of the indication position calculation system, the indicator for an indication position calculation system, and the indication position calculation method may comprise:

a plurality of the light-emitting sections having a predetermined positional relationship with each other, wherein the calculation section may set a predetermined area of the image including the first effective pixel as a first determination area, set another predetermined area of the image including a second effective pixel which has been primarily determined to satisfy the given condition among the pixels out of the first determination area as a second determination area, and then perform the position calculations based on the identification information of the effective pixels within the first determination area and the second determination area.

According to this feature, when the light-emitting section includes a first light-emitting section and a second light-emitting section, for example, effective pixels included in the first determination area can be considered to be pixels corresponding to the first light-emitting section, and effective pixels included in the second determination area can be considered to be pixels corresponding to the second light-emitting section. When the light-emitting section further includes a third light-emitting section and a fourth light-emitting section, a third determination area and a fourth determination area may be set. Even if the indication position of the indicator is calculated in a state in which a plurality of light-emitting sections are provided, the indication position can be more accurately calculated by using the identification information relating to the effective pixels corresponding to each light-emitting section.

(4) In each of the indication position calculation system, the indicator for an indication position calculation system, and the indication position calculation method, the determination section may determine whether or not each of the pixels satisfies a first condition and then determine whether or not each of the pixels satisfies a second condition; and the calculation section may calculate a representative value of the determination area based on the identification information of the effective pixels and then perform the position calculations based on the representative value, while making weight on the identification information of the effective pixels included in the determination area and satisfying the second condition different from weight on the identification information of the effective pixels included in the determination area but not satisfying the second condition.

According to this feature, weighting on the identification information relating to bright effective pixels which are included in the determination area in a predetermined range and have a relatively large light reception can be increased, and weighting on the identification information relating to dark effective pixels which are included in the determination area in a predetermined range and have a relatively small light reception can be reduced, for example. Therefore, the indication position can be more accurately calculated by increasing the degree of effects of bright pixels having a relatively large light-reception information as pixels corresponding to a portion near the center of the light-emitting section and reducing the degree of effects of dark pixels having a relatively small light-reception information as pixels corresponding to the peripheral portion of the light-emitting section when calculating the representative value of the determination area, for example.

(5) In each of the indication position calculation system, the indicator for an indication position calculation system, and the indication position calculation method, the light-emitting section may emit light in a predetermined wavelength band; and the imaging section may have a light reception sensitivity for light including the predetermined wavelength band.

According to this feature, reception of light in another wavelength band can be prevented by causing the wavelength band of light emitted from the light-emitting section to coincide with the light reception sensitivity of the imaging section.

(6) Each of the indication position calculation system, the indicator for an indication position calculation system, and the indication position calculation method may further comprise:

a shielding section provided in the light-emitting section and shielding part of light from the light-emitting section emitted downward in a predetermined degrees of angle or less from the horizontal.

According to this feature, even if a reflecting surface which reflects light from the light-emitting section to produce noise exists at a position lower than the light-emitting section (e.g., when a glass table is provided between the light-emitting section and the imaging section (indicator)), reflected light can be prevented from entering the imaging section from the light-emitting section.

(7) In each of the indication position calculation system, the indicator for an indication position calculation system, and the indication position calculation method, the shielding section may be disposed at a position enabling the shielding section to shield part of the light from the light-emitting section emitted downward from the horizontal so that no reflected light from lower space enters the imaging section when the light-emitting section and the imaging section have a given reference positional relationship.

According to this feature, reflected light can be prevented from entering the imaging section from the light-emitting section when the light-emitting section and the imaging section have the reference positional relationship. Accordingly, reflected light can be reliably prevented from entering the imaging section from the light-emitting section when the indication position calculation system is in a basic state depending on the application.

(8) In each of the indication position calculation system, the indicator for an indication position calculation system, and the indication position calculation method, the light-emitting section may be directed in a direction enabling to prevent light from the light-emitting section from being emitted downward from the horizontal so that no reflected light from lower space enters the imaging section when the light-emitting section and the imaging section have a given reference positional relationship.

According to this feature, reflected light can be prevented from entering the imaging section from the light-emitting section when the light-emitting section and the imaging section have the reference positional relationship by adjusting the direction of the light-emitting section without providing the shielding section. Accordingly, reflected light can be reliably prevented from entering the imaging section from the light-emitting section when the indication position calculation system is in a basic state depending on the application, by adjusting the direction of the light-emitting section.

(9) Each of the indication position calculation system, the indicator for an indication position calculation system, and the indication position calculation method may further comprise:

a filter which is provided in the indicator and through which light in the same wavelength band as light from the light-emitting section is allowed to pass toward the imaging section.

This makes it possible to more accurately calculate the indication position by reducing noise due to light in a wavelength band differing from that of light emitted from the light-emitting section.

(10) Each of the indication position calculation system, the indicator for an indication position calculation system, and the indication position calculation method may comprise:

a plurality of the light-emitting sections having a predetermined positional relationship with each other, wherein the calculation section may perform the position calculations based on the identification information of the effective pixels corresponding to each of the light-emitting sections.

This makes it possible to more accurately calculate the indication position by calculating the indication position using the positional relationship between a plurality of representative values.

(11) According to one embodiment of the invention, there is provided a game system calculating an indication position of an indicator, the game system comprising:

a display section which displays an object;

a light-emitting section which has a given positional relationship with the display section;

an imaging section which is provided in the indicator, acquires an image and successively outputs light-reception information of pixels of the acquired image, wherein one of the pixels having the light-reception information output primarily is disposed on a lower side of the image and another one of the pixels having the light-reception information output last is disposed on an upper side of the image when the indicator is held in a reference position;

a determination section which determines whether or not the pixels are effective pixels satisfying a given condition based on the light-reception information; and a calculation section which performs position calculations based on identification information of the effective pixels in order to obtain the indication position of the indicator when light received by the effective pixels is included in light emitted from the light-emitting section, the calculation section performing the position calculations based on the identification information of a first effective pixel which is one of the effective pixels and is primarily determined to satisfy the given condition.

According to the above embodiment, since it is unnecessary to determine whether the effective pixel which has been determined to satisfy the given condition is a pixel corresponding to the light-emitting section or a pixel corresponding to noise, a game system can be provided which can promptly and accurately calculate the indication position of the indicator on the display section with a reduced processing load.

These embodiments of the invention will be described below. Note that the embodiments described below do not in any way limit the scope of the invention laid out in the claims herein. In addition, not all of the elements of the embodiments described below should be taken as essential requirements of the invention.

1. Outline of System

FIG. 1 is a diagram schematically showing a game system 10 to which an indication position calculation system according to one embodiment of the invention is applied. The game system 10 according to this embodiment includes a display section 12 which displays a game image such as a target object TO on a display screen 11, a light-emitting unit 15 which is provided at the top of the display section 12 and includes two light-emitting sections 13 and 14, each having an infrared light source such as an infrared LED, a controller 16 (indicator, shooting device, or pointing device) which is held by a player P so that its position and direction can be arbitrarily changed and is used to indicate an arbitrary position on the display screen 11, and a game device 17 which performs a game process and the like.

Each of the light-emitting sections 13 and 14 according to this embodiment has the infrared light source on the front surface. The light-emitting sections 13 and 14 are provided on the top surface of the display section 12 at a predetermined interval so that the front surfaces face in the same direction as the display screen 11 (i.e., direction toward the player). Each of the light-emitting sections 13 and 14 emits infrared light forward from the light source.

The controller 16 according to this embodiment is formed to imitate the shape of a gun, and includes a barrel GB which is directed toward the display screen 11, a grip GG which extends from the barrel GB and is held by the player P with the hand, and a trigger GT which can be operated using the forefinger of the hand holding the grip GG. An image sensor 18 (light-receiving section or imaging section) such as a CMOS sensors is provided on the end of the barrel GB. The image sensor 18 receives infrared light (light in the same wavelength band as light emitted from the light-emitting sections 13 and 14) which enters the image sensor 18 along the direction in which the end of the controller 16 (barrel GB) is directed, and acquires (images) the infrared light.

In this embodiment, a filter FI which allows only light in a wavelength band corresponding to infrared light (i.e., light having the same wavelength as light emitted from the light-emitting sections 13 and 14) to pass through is provided on the front side of the image sensor 18 (i.e., the end of the controller 16 at a position forward from the image sensor 18) so that light in a predetermined wavelength band enters the image sensor 18. An image sensor having a light reception sensitivity in a wavelength band within a predetermined range including infrared light (light having a predetermined wavelength) may be used as the image sensor 18 without providing the filter FI.

The game system 10 calculates the positional relationship between the light-emitting sections 13 and 14 and the controller 16 based on position information relating to the light-emitting sections 13 and 14 in an image acquired by the image sensor 18 and reference position information set in advance, and calculates information relating to the indication position of the controller 16 on the display screen 11. The game system 10 determines whether or not the indication position of the controller 16 when the trigger GT of the controller 16 has been pulled coincides with the position of the target object TO displayed on the display screen 11, and performs a game process such as an image display control process or a score calculation process.

Figure 2:
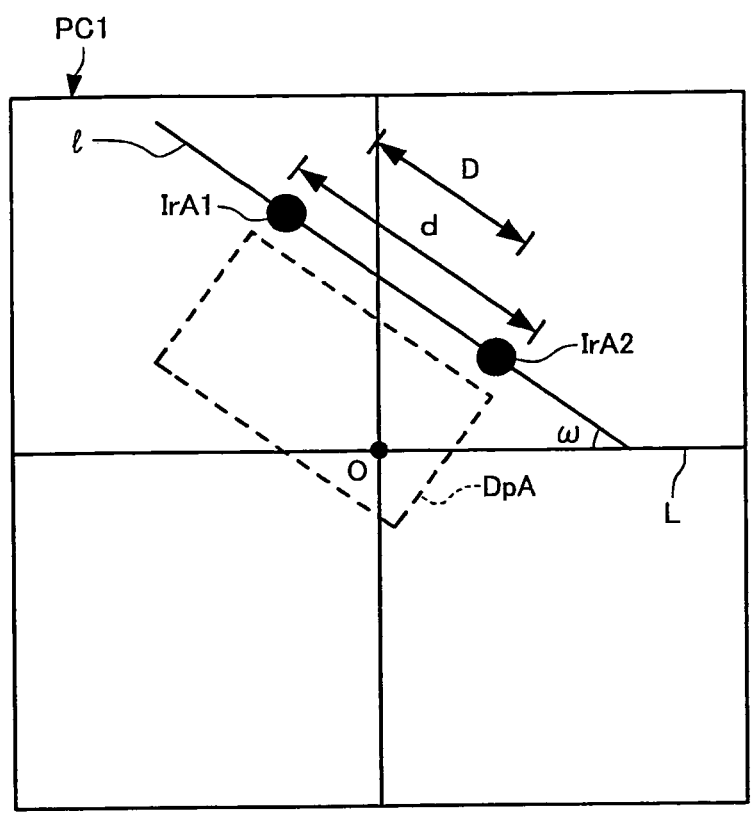
FIG. 2 is a diagram illustrating an example of an image acquired according to one embodiment of the invention.

FIG. 2 is a diagram showing an example of an image PC1 acquired by the image sensor 18 when the controller 16 is directed toward the display screen 11. The image sensor 18 according to this embodiment includes 22,050 (175×126) light-receiving elements (imaging elements) arranged in a matrix on a rectangular surface, and acquires the image PC1. One pixel of the image PC1 corresponds to one light-receiving element. In this embodiment, the image PC1 is updated every 1/54th of a second depending on the position and the direction of the controller 16. The game system 10 calculates the information relating to the indication position of the controller 16 on the display screen 11 using position information relating to two infrared light source areas IrA1 and IrA2 (i.e., areas obtained by imaging infrared light from the light-emitting sections 13 and 14) in the image PC1. In this embodiment, an origin O (i.e., center of the image PC1) is considered to be the indication point of the controller 16, and information relating to the indication position of the controller 16 on the display screen 11 is calculated based on the positional relationship among the origin O, the infrared light source areas IrA1 and IrA2 in the image PC1, and a display screen area DpA which is an area corresponding to the display screen 11 in the image PC1.

In the example shown in FIG. 2, the infrared light source areas IrA1 and IrA2 are formed above the center of the image PC1 to some extent in a state in which a straight line 1 which connects the infrared light source areas IrA1 and IrA2 is rotated clockwise by omega degrees with respect to a reference line L (i.e., X axis of the image sensor 18) of the image PC1. In the example shown in FIG. 2, the origin O corresponds to a predetermined position on the lower right of the display screen area DpA so that the coordinates of the indication position of the controller 16 on the display screen 11 can be calculated. The rotation angle of the controller 16 around the indication direction axis with respect to the display screen 11 can be calculated based on the rotation angle omega of the straight line 1 which connects the infrared light source areas IrA1 and IrA2 with respect to the reference line L. The distance between the controller 16 and the display screen 11 in the example shown in FIG. 2 can be calculated based on the ratio of a reference distance D between the infrared light source areas IrA1 and IrA2 when the controller 16 is located at a predetermined distance from the display screen 11 and a distance d between the infrared light source areas IrA1 and IrA2 in the example shown in FIG. 2 by setting the reference distance D in advance.

According to this embodiment, information relating to the indication position of the controller 16 on the display screen 11 and the like can be calculated even if the player P moves his hand while holding the controller 16 as shown in FIG. 1 or changes the position and the direction of the controller 16 due to the movement of the player P.

In the example shown in FIG. 1, the game device 17 and the controller 16 are connected via a cable. Note that information may be transmitted and received between the game device 17 and the controller 16 via wireless communication. The light-emitting sections 13 and 14 need not be necessarily provided at the top of the display section 12. The light-emitting sections 13 and 14 may be provided at an arbitrary position (e.g., bottom or side) of the display section 12. Specifically, the light-emitting sections 13 and 14 may be provided to have a given positional relationship with the display section 12 within a range in which the image sensor 18 can receive light when the controller 16 is directed toward the display screen 11.

2. Configuration of Image Sensor

Figure 3:
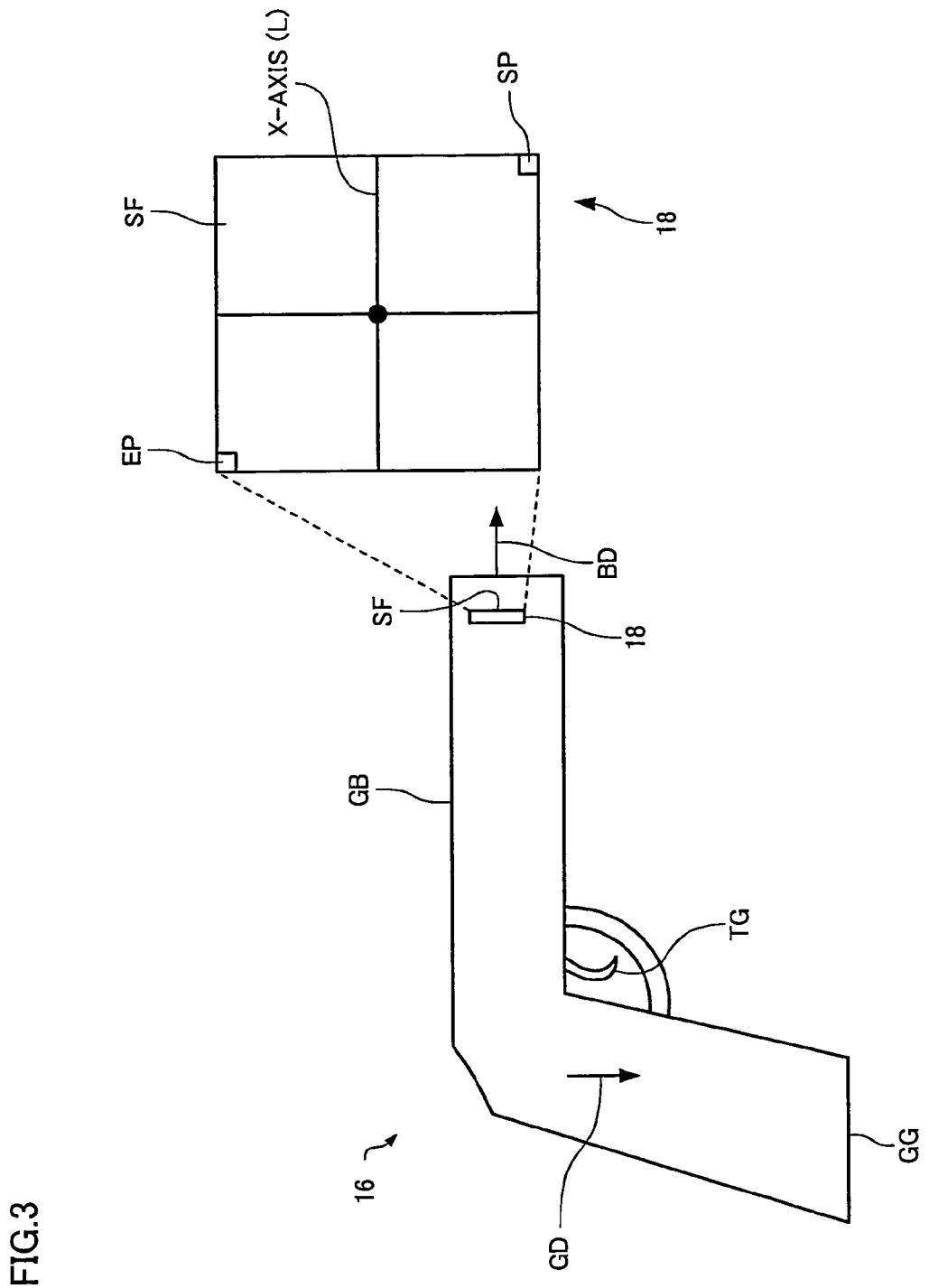
FIG. 3 is a diagram illustrating an example of an indicator and an imaging section according to one embodiment of the invention.

The details of the configuration of the image sensor 18 according to this embodiment are as follows. FIG. 3 provides a side view of the controller 16 including the image sensor 18 and an enlarged front view of the image sensor 18. FIG. 3 is a view illustrative the installation state of the image sensor 18 in the controller 16. As shown in FIG. 3, the image sensor 18 according to this embodiment is provided in the controller 16 so that its light-receiving surface SF perpendicularly intersects an indication direction BD of the barrel GB. The image sensor 18 is provided in the controller 16 so that the X axis (reference line L) of the image sensor 18 perpendicularly intersects an installation direction GD of the grip GG.

Therefore, when the player P holds the controller 16 so that the installation direction GD of the grip GG faces perpendicularly downward, the indication direction BD and the X axis (reference line L) of the image sensor 18 become horizontal. In this embodiment, a state in which the installation direction GD of the grip GG faces perpendicularly downward is referred to as a reference position of the controller 16. Specifically, the term "reference position of the controller 16" refers to an average position (direction or use state) of the controller 16 when the player P holds the controller 16 as if to hold an actual gun.

In the image sensor 18, each of the 22,050 (175×126) light-receiving elements arranged on the rectangular surface SF receives infrared light which enters along the direction in which the end of the controller 16 is directed, and successively outputs light-reception information relating to each pixel. The controller 16 then determines whether or not the light-reception information relating to each pixel is larger than a threshold value set corresponding to the quantity of light emitted from the light-emitting sections 13 and 14 (i.e., whether or not each pixel is an effective pixel which satisfies a given condition) to determines whether or not each pixel is a pixel corresponding to the infrared light. However, a pixel corresponding to infrared light may be a pixel corresponding to an infrared light source other than the light-emitting sections 13 and 14 (i.e., light source which emits light in the same wavelength band as light emitted from the light that light-emitting sections 13 and 14) instead of a pixel corresponding to the light-emitting sections 13 and 14.

Figure 4A:
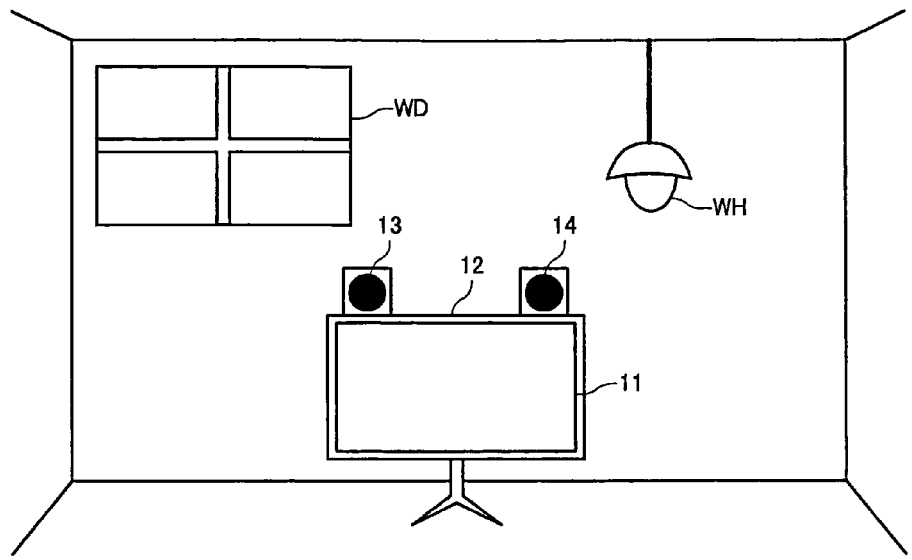
FIG. 4A is a diagram illustrating an example of an installation state of a system according to one embodiment of the invention.

FIG. 4A is a diagram showing a state around the light-emitting sections 13 and 14 viewed from the front side of the display screen 11. When forming the game system 10 in a room or the like using a consumer game device as the game device 17 according to this embodiment and using a television monitor as the display section 12, an infrared light source other than the light-emitting sections 13 and 14 may exist. As shown in FIG. 4A, a window WD through which external light enters, an incandescent lamp WH, and the like serve as infrared light sources. When the image sensor 18 receives infrared light which enters through the window WD, light emitted from the incandescent lamp WH, and the like, the received infrared light serves as noise so that an accurate indication position may not be calculated.

Figure 4B:
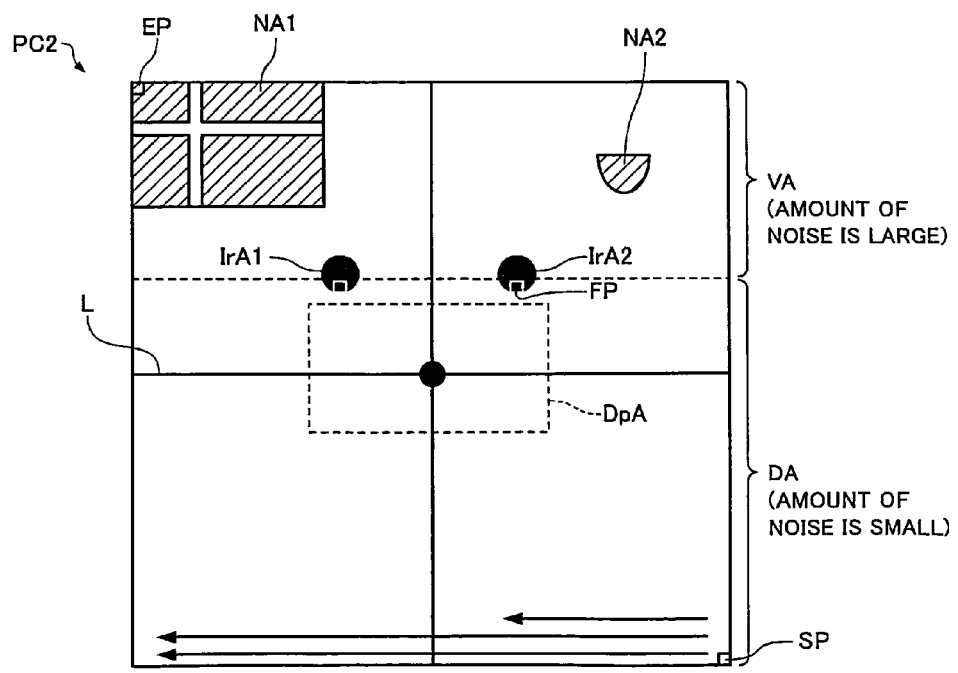
FIG. 4B is a diagram illustrating an example of an image acquired according to one embodiment of the invention.

FIG. 4B shows an image PC2 acquired by the image sensor 18 in a state shown in FIG. 4A when the controller 16 is held in the reference position toward the display screen 11. As shown in FIG. 4A, the window WD, the incandescent lamp WH, and the like are generally positioned above the light-emitting sections 13 and 14 disposed at the top of the display screen 11 in a real space. In an image PC2 acquired by the image sensor 18, as shown in FIG. 4B, pixels corresponding to a noise area NA1 due to the window WD and a noise area NA2 due to the incandescent lamp WH generally occur in an area UA obtained by imaging a portion above the light-emitting sections 13 and 14.

A related-art indication position calculation system successively outputs the light-reception information relating to each pixel while scanning each row from the upper row to the lower row, starting from the uppermost-leftmost pixel (starting pixel) toward the lowermost-rightmost pixel (end pixel) in the image PC2 shown in FIG. 4B, and determines whether or not each pixel is a pixel corresponding to the light source. Specifically, in a related-art indication position calculation system, the image sensor 18 is provided in the controller 16 so that the starting pixel is disposed on the upper side and the end pixel is disposed on the lower side when the controller 16 is held in the reference position. Therefore, a related-art indication position calculation system successively outputs the light-reception information relating to each pixel from upper pixels in which pixels corresponding to noise tend to occur. Accordingly, pixels corresponding to the light source include not only pixels corresponding to the light-emitting sections 13 and 14, but also pixels corresponding to the noise areas NA1 and NA2. Therefore, a related-art indication position calculation system must distinguish pixels corresponding to the light-emitting sections 13 and 14 from pixels corresponding to noise.

On the other hand, pixels corresponding to noise rarely occur in an area DA obtained by imaging a portion below the light-emitting sections 13 and 14, as shown in FIG. 4B. In this embodiment, the image sensor 18 is provided in the controller 16 so that a starting pixel SP is disposed on the lower side and an end pixel EP is disposed on the upper side when the controller 16 is held in the reference position, taking such a situation into consideration. The image sensor 18 horizontally scans pixels in the leftward direction from the lowermost-rightmost pixel in the acquired image PC2 as the starting pixel SP. When the pixels in the lowermost row have been completely scanned, the image sensor 18 horizontally scans pixels in the next (upper) row in the leftward direction from the rightmost pixel. The image sensor 18 successively outputs the light-reception information relating to each pixel while scanning pixels in each row from the lower row to the upper row until the uppermost-leftmost end pixel EP is reached. Specifically, when the controller 16 is held in the reference position, the image sensor 18 successively outputs the light-reception information relating to each pixel from pixels on the lower side in which pixels corresponding to noise rarely occur.

According to this embodiment, a first effective pixel FP of which the light-reception information has been output from the image sensor 18 and which has been determined to satisfy a given condition is a pixel corresponding to the light-emitting section 13 or 14 when the controller 16 is held in the reference position. Therefore, the indication position can be accurately calculated using the first effective pixel FP as a pixel corresponding to the light-emitting section 13 or 14 without determining whether the pixel corresponding to the light source is a pixel corresponding to the light-emitting section 13 or 14 or a pixel corresponding to noise. According to this embodiment, since it is unnecessary to determine whether the effective pixel which has been determined to satisfy a given condition is a pixel corresponding to the light-emitting section 13 or 14 or a pixel corresponding to noise, the indication position can be promptly and accurately calculated with a reduced processing load.

3. Circuit Configuration

Figure 5:
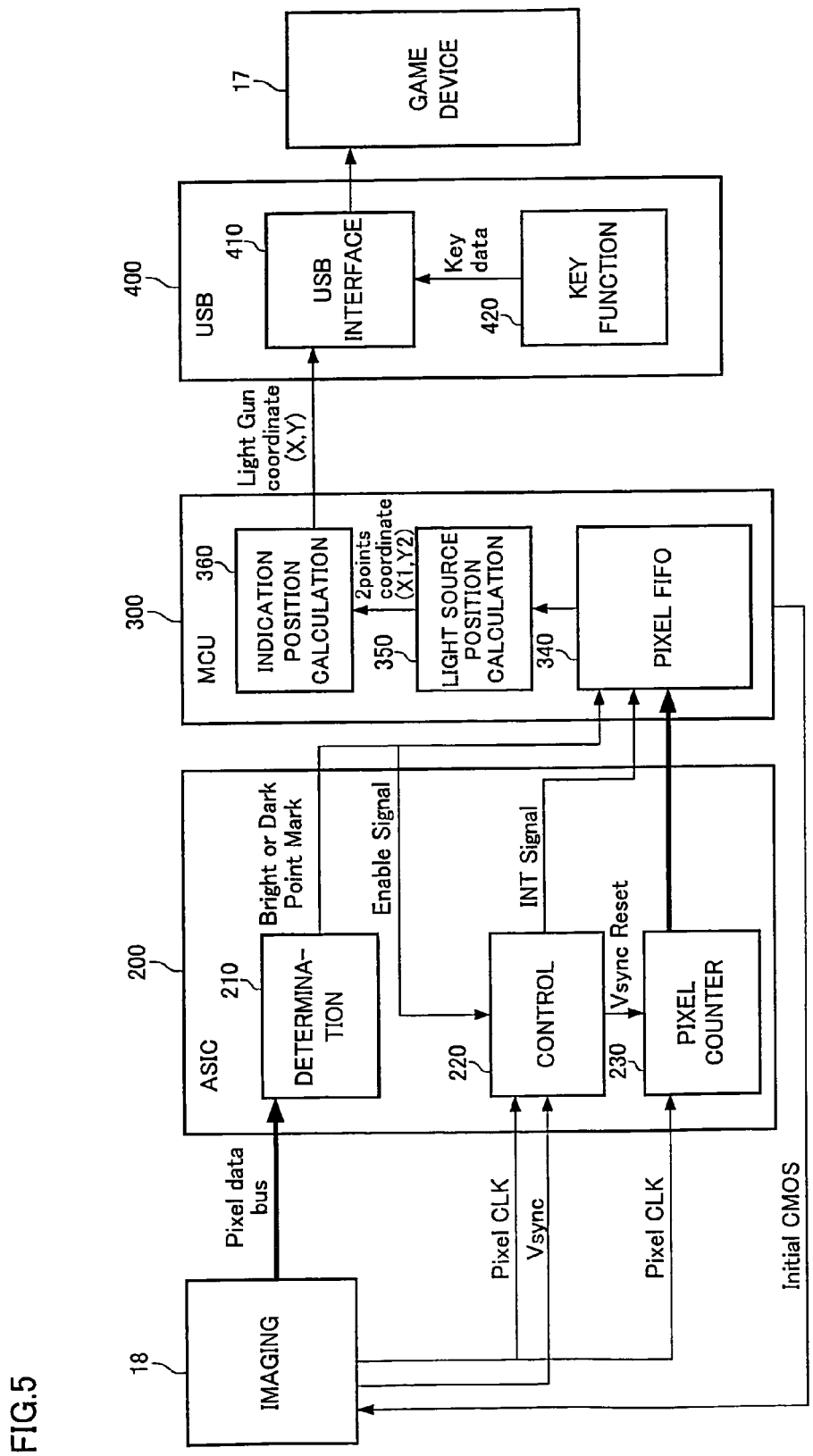
FIG. 5 is a functional block diagram showing an example of an indicator according to one embodiment of the invention.

FIG. 5 is a functional block diagram showing an indication position detection section provided in the controller 16 according to this embodiment. The indication position detection section includes the image sensor 18, an ASIC 200, an MCU 300, and a USB 400.

The image sensor 18 is initialized when the image sensor 18 has received an initialization signal from the MCU 300. The image sensor 18 acquires the light-reception information in pixel units by receiving infrared light which enters along a direction in which the end of the controller 16 is directed to acquire an image along the direction in which the end of the controller 16 is directed. In this embodiment, the light-reception information (quantity of received light) of each pixel is acquired using a two-digit hexadecimal number in the range from 00 to FF. A starting pixel is set on one end of the acquired image, and an end pixel is set on the other end. The image sensor 18 successively outputs the light-reception information relating to each pixel from the starting pixel to the end pixel to the ASIC 200.

The image sensor 18 outputs a pixel clock signal and a vertical synchronization signal to a control section 220 of the ASIC 200, and outputs the pixel clock signal to a pixel counter 230. This allows the control section 220 and the pixel counter 230 to synchronize with the output timing of the light-reception information relating to each pixel from the image sensor 18.

The ASIC 200 includes a determination section 210, the control section 220, and the pixel counter 230.

The determination section 210 determines whether or not each pixel satisfies a given condition based on the light-reception information relating to each pixel successively output from the image sensor 18. Specifically, the determination section 210 determines that a first condition is satisfied when the light-reception information relating to each pixel is 80 (two-digit hexadecimal number) or more. The determination section 210 determines that a pixel of which the light-reception information is 80 or more to be a pixel corresponding to the infrared light source.

In this embodiment, the determination section 210 determines whether or not each pixel satisfies the first condition, and determines whether or not an effective pixel which satisfies the first condition satisfies a second condition. Specifically, a pixel group of pixels corresponding to the light source is bright at the center and becomes darker as the distance from the center increases due to a decrease in luminance. In this embodiment, the determination section 210 determines that the second condition is satisfied when the light-reception information relating to an effective pixel is F0 or more. The determination section 210 determines that a pixel of which the light-reception information is 80 to EF to be a dark pixel corresponding to the peripheral portion of the infrared light source, and determines that a pixel of which the light-reception information is F0 to FF to be a bright pixel corresponding to the center portion of the infrared light source.

The determination section 210 outputs an enable signal to the control section 220 while determining whether or not the light-reception information relating to each pixel successively output from the image sensor 18 satisfies the first condition. When the light-reception information relating to each pixel satisfies the second condition, determination section 210 outputs a bright signal which indicates the pixel is bright to a pixel FIFO 340 of the MCU 300.

The control section 220 allows a 15-bit count value output from the pixel counter 230 to be written into the pixel FIFO 340 when the control section 220 receives the enable signal from the determination section 210. The pixel counter 230 is reset upon reception of the vertical synchronization signal output from the image sensor 18 from the control section 220, and outputs the 15-bit count value from the starting pixel (0) to the end pixel (22,050) of the image sensor 18 in synchronization with the output of the light-reception information relating to each pixel. In this embodiment, the count value of an effective pixel of which the light-reception information has been determined to satisfy the first condition is written into the pixel FIFO 340.

In this case, the pixel counter 230 writes 16-bit data into the pixel FIFO 340 by adding 0 as the most significant bit of the 15-bit count value when the bright signal is received from the determination section 210 and adding 1 as the most significant bit of the 15-bit count value when the bright signal is not received from the determination section 210. Specifically, the count value of an effective pixel of which the light-reception information has been determined to satisfy the first condition and the data which indicates whether or not the effective pixel satisfies the second condition (16 bits in total) are stored in the pixel FIFO 340.

The MCU 300 includes the pixel FIFO 340, a light source position calculation section 350, and an indication position calculation section 360.

The pixel FIFO 340 stores 128 pieces of 16-bit data relating to the effective pixel based on the data output from the ASIC 200. The pixel FIFO 340 successively outputs the 16-bit data relating to each effective pixel to the light source position calculation section 350 in a first-in first-out manner.

The light source position calculation section 350 sets a first determination area in a predetermined range including a first effective pixel based on first data stored in the pixel FIFO 340 after the image sensor 18 has been initialized (i.e., the count value of the first effective pixel which has been determined to satisfy the first condition). The light source position calculation section 350 sets a second determination area in a predetermined range including a second effective pixel based on the count value of the second effective pixel which is a pixel in the area other than the first determination area and is a first pixel which has been determined to satisfy the first condition). The light source position calculation section 350 performs position calculations based on the count values (identification information) of effective pixels which satisfy the first condition and are included in the first determination area and the count values of effective pixels which satisfy the first condition and are included in the second determination area.

Figure 6:
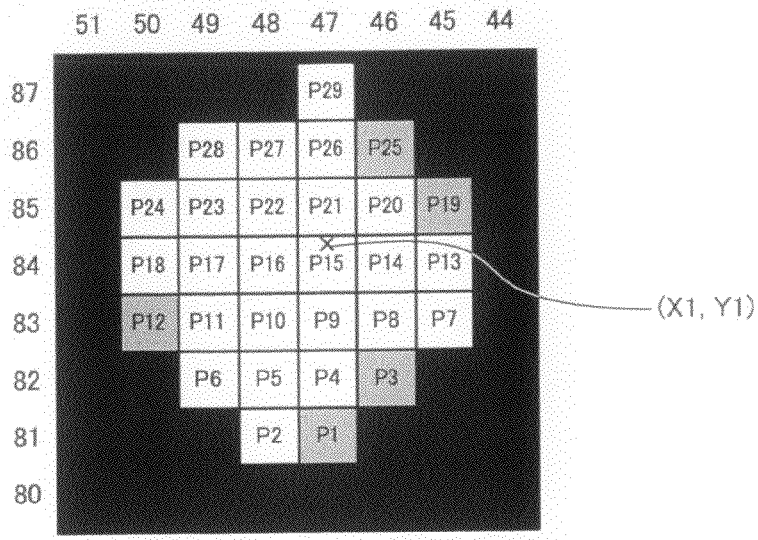
FIG. 6 is a diagram illustrating an example of part of an image acquired according to one embodiment of the invention.

FIG. 6 shows part of an enlarged image acquired by the image sensor 18. FIG. 6 is a view illustrative of calculations of a representative value of the determination area. In FIG. 6, a white square indicates an effective pixel which satisfies the first condition and the second condition, a gray square indicates an effective pixel which satisfies the first condition but does not satisfy the second condition, and a black area indicates ineffective pixels which do not satisfy the first condition and the second condition. As shown in FIG. 6, the image sensor 18 horizontally and sequentially scans pixels from the lower right pixel and outputs the light-reception information relating to each pixel. When the determination section 210 determines whether or not each pixel satisfies the first condition, the determination section 210 determines that a pixel P1 is a first effective pixel which satisfies the first condition. When the 16-bit data relating to the first effective pixel P1 is input to the light source position calculation section 350 from the pixel FIFO 340, the light source position calculation section 350 sets a first determination area JA1 in a circular region in a predetermined range including the first effective pixel, as shown in FIG. 6. Specifically, the light source position calculation section 350 sets the first determination area JA1 in a range in which it is estimated that other effective pixels corresponding to the light-emitting section 13 or 14 exist when the first effective pixel is a pixel corresponding to the light-emitting section 13 or 14.

The light source position calculation section 350 determines whether or not each effective pixel is included in the first determination area JA1 based on the count value of each effective pixel sequentially input from the pixel FIFO 340. The light source position calculation section 350 calculates a representative value (center-of-gravity coordinates) of the first determination area based on the count value of each effective pixel included in the first determination area JA1. In this embodiment, the light source position calculation section 350 transforms the count value of each effective pixel into a coordinate value of each pixel in an image PC acquired by the image sensor 18, and then calculates the center-of-gravity coordinates of the first determination area JA1.

Specifically, the light source position calculation section 350 calculates a remainder when dividing the count value (one of 0 to 22,050) by 175 which is the number of pixels on the X axis of the image sensor 18 to calculate the X coordinate of the pixel in the image from the count value, and calculates a quotient when dividing the count value by 175 to calculate the Y coordinate of the pixel in the image from the count value. For example, the light source position calculation section 350 calculates a coordinate value (0, 0) from the count value 0 of the starting pixel as indicated by X=0 mod 175=0 and Y=0/175=0. The light source position calculation section 350 calculates a coordinate value (47, 82) from the count value 14397 as indicated by X=14397 mod 175=47 and Y=14397/175=82.

The light source position calculation section 350 divides the sum of the X coordinate components of the effective pixels included in the first determination area JA1 by the number of the effective pixels included in the first determination area JA1 to calculate the X coordinate component of the center-of-gravity coordinates of the first determination area JA1. Likewise, the light source position calculation section 350 divides the sum of the Y coordinate components of the effective pixels included in the first determination area JA1 by the number of the effective pixels included in the first determination area JA1 to calculate the Y coordinate component of the center-of-gravity coordinates of the first determination area JA1. In this embodiment, the light source position calculation section 350 calculates the center-of-gravity coordinates of the first determination area JA1 based on the coordinate component value of each effective pixel while changing weighting on the coordinate component value of each effective pixel between an effective pixel which is included in the first determination area JA1 and satisfies the second condition (bright pixel) and an effective pixel which is included in the first determination area JA1 and does not satisfy the second condition (dark pixel).

Specifically, the light source position calculation section 350 performs the above calculations while doubling the coordinate component value and the number of bright pixels. In the example shown in FIG. 6, pixels P7 and P13 of which the X coordinate component value is 45 are bright pixels. Therefore, the coordinate component values 45×2 of the pixels P7 and P13 are doubled and added to the coordinate component value. The number of bright pixels (2) is also doubled and added to the number of pixels. Since a pixel P19 is a dark pixel, the coordinate component value 45 of the pixel P19 is directly added to the coordinate component value, and the number of bright pixels (1) is directly added to the number of pixels. The pixels having other X coordinate component values are similarly calculated. Therefore, the X component X1 of the center-of-gravity coordinates of the first determination area JA1 in the example shown in FIG. 6 is calculated as follows.

$$X1 = [2*(45*2+46*3+47*6+48*6+49*5+50*2)+$$
$$(45+46*2+47+50)]/[2*(2+3+6+6+5+2)+$$
$$(1+2+1+1)]$$
$$= (2286+234)/(48+5)$$
$$= 2520/53$$
$$= 47.547$$

Likewise, the Y component Y1 of the center-of-gravity coordinates of the first determination area JA1 is calculated as follows.

$$Y1 = [2*(81+82*3+83*5+84*6+85*5+86*3+87)+$$
$$(81+82+83+85+86)]/[2*(1+3+5+6+5+3+1)+$$
$$(1+1+1+1+1)]$$
$$= (4032+417)/(48+5)$$
$$= 2520/53$$
$$= 84.962$$

Specifically, the center-of-gravity coordinates (X1, Y1) of the first determination area JA1 in the example shown in FIG. 6 are calculated to be (47.547, 84.962).

The light source position calculation section 350 sets a second determination area JA2 in a predetermined range including a second effective pixel which is included in an area other than the first determination area JA1 and is a first pixel which has been determined to satisfy the first condition, and calculates the center-of-gravity coordinates (X2, Y2) of the second determination area JA2 in the same manner as the first determination area JA1. The light source position calculation section 350 outputs the center-of-gravity coordinates (X1, Y1) of the first determination area JA1 and the center-of-gravity coordinates (X2, Y2) of the second determination area JA2 to the indication position calculation section 360.

The indication position calculation section 360 calculates the indication position of the controller 16 on the display screen 11 based on the center-of-gravity coordinates (X1, Y1) of the first determination area JA1 and the center-of-gravity coordinates (X2, Y2) of the second determination area JA2. Specifically, the indication position calculation section 360 calculates the positional relationship between the light-emitting sections 13 and 14 and the controller 16 using the center-of-gravity coordinates (X1, Y1) of the first determination area JA1 or the center-of-gravity coordinates (X2, Y2) of the second determination area JA2 relatively positioned on the left of the image PC as the center coordinates of the light-emitting section 13 disposed on the upper left portion of the display section 12 and the center-of-gravity coordinates (X1, Y1) or the center-of-gravity coordinates (X2, Y2) relatively positioned on the right of the image PC as the center coordinates of the light-emitting section 14 disposed on the upper right portion of the display section 12, and calculates the indication position of the controller 16 on the display screen 11. The indication position calculation section 360 outputs the calculated indication position to the USB 400.

The USB 400 includes a USB interface 410 and a key function section 420.

The USB interface 410 outputs the indication position data input from the MCU 300 to the game device 17. The key function section 420 outputs an operation signal based on operation of the trigger and other operation keys of the controller 16. The game device 17 identifies the indication position data relating to the controller 16 at a timing at which the trigger operation signal is input to be an impact position of a virtual bullet on a game screen (display screen 11), and performs game calculations such as determining whether or not the target has been hit.

4. Flow of Position Calculation Process

Figure 7:
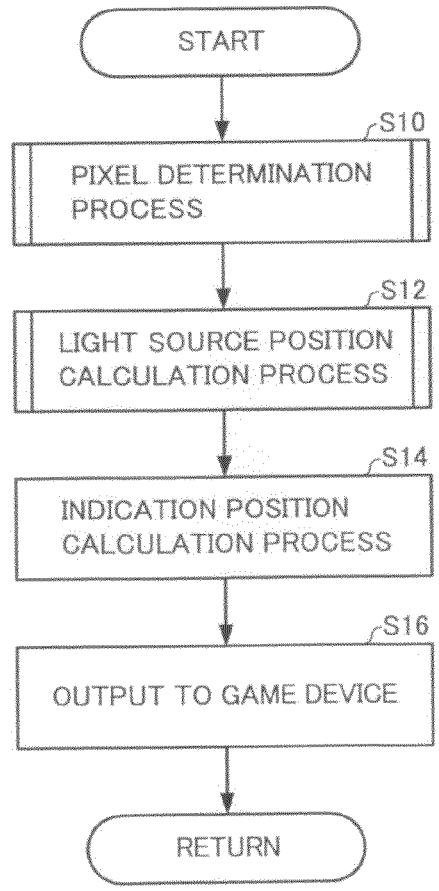
FIG. 7 is a flowchart showing an example of a process according to one embodiment of the invention.

The flow of a position calculation process of the controller 16 is described below using a flowchart. FIG. 7 is a flowchart showing an example of an outline of the position calculation process according to this embodiment. As shown in FIG. 7, the determination section 210 determines whether or not each pixel satisfies a given condition based on the light-reception information relating to each pixel output from the image sensor 18 (step S10). The light source position calculation section 350 calculates the center-of-gravity positions of two determination areas corresponding to the two light sources based on the identification information relating to the first effective pixel and the second effective pixel (step S12). The indication position calculation section 360 calculates the indication position of the controller 16 based on the center-of-gravity positions of the two determination areas (step S14). The indication position calculation section 360 outputs the indication position of the controller 16 to the game device 17 (step S16). In this embodiment, the process in the steps S10 to S16 is repeated every 1/54th of a second.

Figure 8:
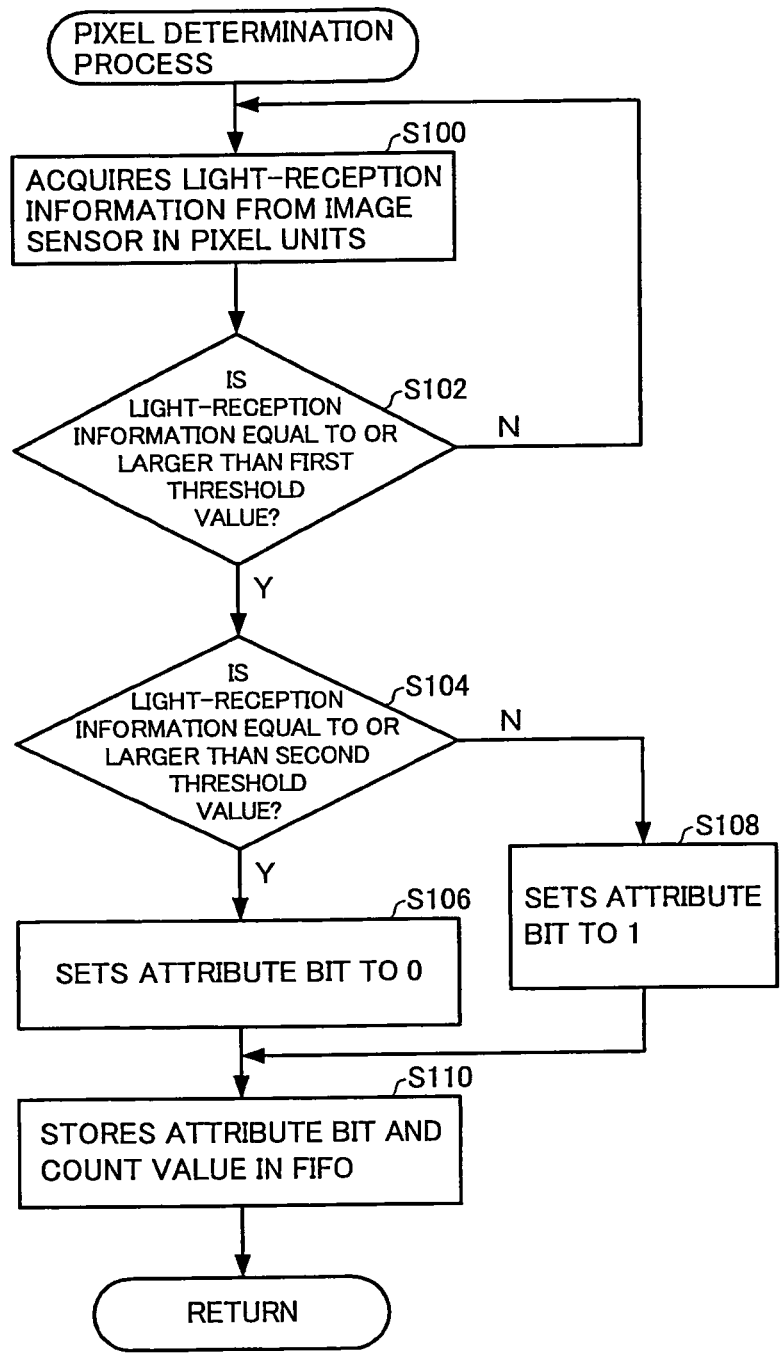
FIG. 8 is a flowchart showing an example of a process according to one embodiment of the invention.

FIG. 8 is a flowchart showing an example of the details of the pixel determination process in the step S10 shown in FIG. 7. As shown in FIG. 8, the determination section 210 acquires the light-reception information from the image sensor 18 in pixel units (step S100), and determines whether or not the light-reception information is equal to or larger than a first threshold value (i.e., satisfies the first condition) (step S102). When the determination section 210 has determined that the light-reception information is not equal to or larger than the first threshold value (N in step S102), the determination section 210 acquires the light-reception information relating to another pixel (step S100). When the determination section 210 has determined that the light-reception information is equal to or larger than the first threshold value (Y in step S102), the determination section 210 determines whether or not the light-reception information is equal to or larger than a second threshold value (i.e., satisfies the second condition) (step S104). When the determination section 210 has determined that the light-reception information is equal to or larger than the second threshold value (Y in step S104), the determination section 210 sets the most significant bit of the 16-bit data at 0 as the attribute bit (step S106). When the determination section 210 has determined that the light-reception information is not equal to or larger than the second threshold value (N in step S104), the determination section 210 sets the most significant bit of the 16-bit data at 1 as the attribute bit (step S108). The determination section 210 stores the 16-bit data in which the most significant bit is the attribute bit and the lower-order 15 bits are the count value of the pixel in the pixel FIFO 340 (step S110). In this embodiment, the process in the steps S100 to S110 is repeatedly performed on each pixel of the image sensor 18 in synchronization with the pixel clock signal output from the image sensor 18.

Figure 9:
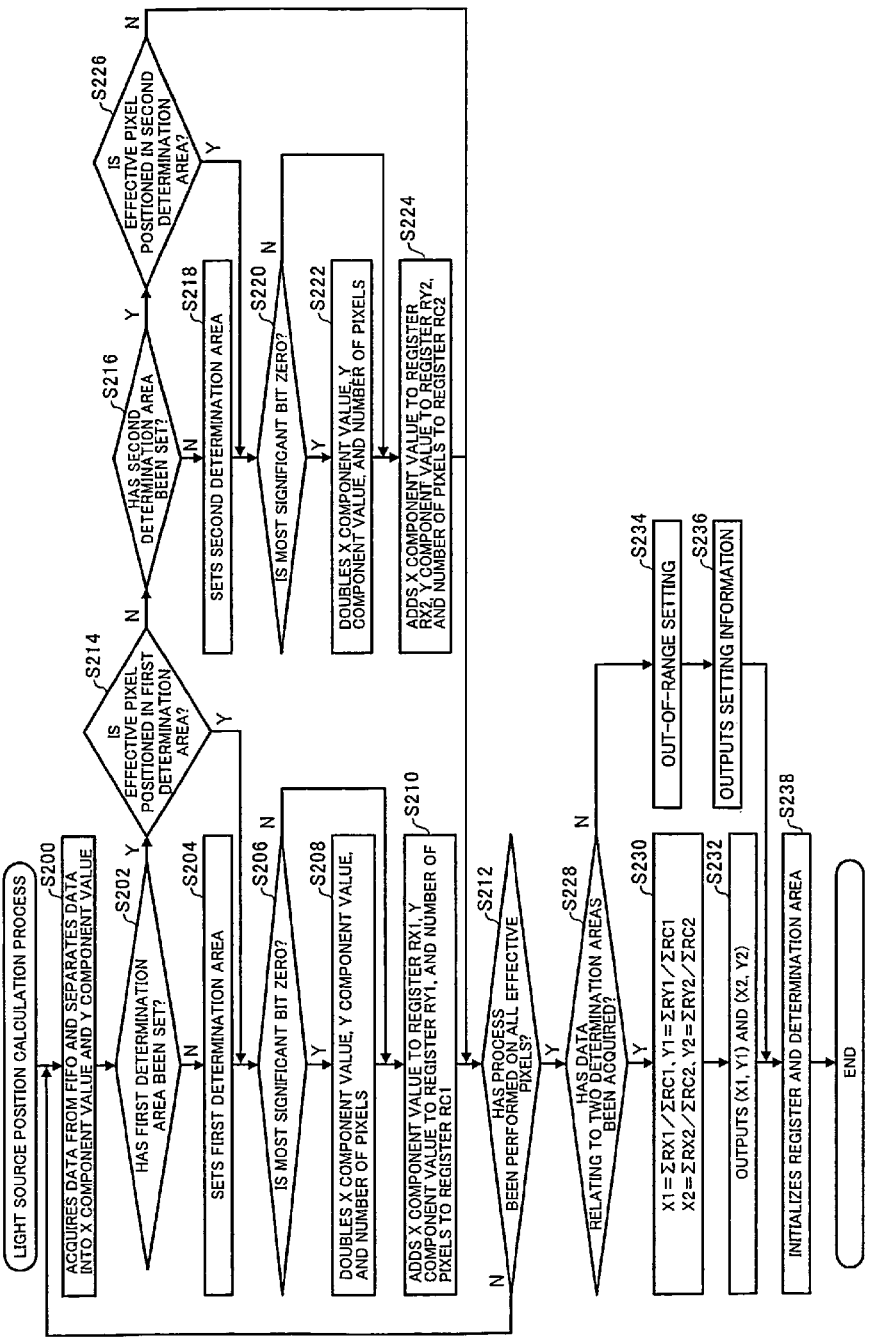
FIG. 9 is a flowchart showing an example of a process according to one embodiment of the invention.

FIG. 9 is a flowchart showing an example of the details of the light source position calculation process in the step S12 shown in FIG. 7. As shown in FIG. 9, the light source position calculation section 350 acquires the 16-bit data relating to the first effective pixel from the pixel FIFO 340, and separates the lower-order 15-bit count value into the X component value and the Y component value (step S200). The light source position calculation section 350 determines whether or not the first determination area has been set (step S202). When the light source position calculation section 350 has determined that the first determination area has not been set (N in step S202), the light source position calculation section 350 determines the pixel to be the first effective pixel, and sets the first determination area in an area in a predetermined range including the first effective pixel (step S204).

The light source position calculation section 350 determines whether or not the most significant bit of the 16-bit data is 0 (step S206). When the light source position calculation section 350 has determined that the most significant bit is 0 (i.e., bright pixel) (Y in step S206), the light source position calculation section 350 doubles the X component value, the Y component value, and the number of pixels (step S208), and adds the X component value to a register RX1, the Y component value to a register RY1, and the number of pixels to a register RC1 (step S210). When the light source position calculation section 350 has determined that the most significant bit is 1 (i.e., dark pixel) (N in step S206), the light source position calculation section 350 adds the X component value to the register RX1, the Y component value to the register RY1, and the number of pixels to the register RC1 without doubling the X component value, the Y component value, and the number of pixels (step S210).

The light source position calculation section 350 determines whether or not the process from the step S200 has been performed on all effective pixels included in the pixels 0 to 22,050 (pixels of one frame) of the image sensor 18 (step S212). When the light source position calculation section 350 has determined that the process has been performed on all effective pixels (N in step S212), the light source position calculation section 350 returns to the step S200, and acquires the 16-bit data relating to the next pixel from the pixel FIFO 340. The light source position calculation section 350 repeats the process in the steps S200 to S212.

With regard to the next effective pixel, the light source position calculation section 350 determines that the first determination area has been set in the step S202 (Y in step S202), and determines whether or not the effective pixel is positioned in the first determination area based on the coordinate value of the effective pixel (step S214). When the light source position calculation section 350 has determined that the effective pixel is positioned in the first determination area (Y in step S214), the light source position calculation section 350 performs the process in the steps S206 to S212. When the light source position calculation section 350 has determined that the effective pixel is not positioned in the first determination area (N in step S214), the light source position calculation section 350 determines whether or not the second determination area has been set (step S216).

When the light source position calculation section 350 has determined that the second determination area has not been set (N in step S216), the light source position calculation section 350 determines the effective pixel to be the second effective pixel, and sets the second determination area in an area in a predetermined range including the second effective pixel (step S218). In steps S220 to S224, the light source position calculation section 350 performs a process similar to the process in the steps S206 to S210 performed on the effective pixel in the first determination area, and adds the X component value to a register RX2, the Y component value to a register RY2, and the number of pixels to a register RC2 (step S224).

When the light source position calculation section 350 has determined that the second determination area has been set in the step S216 (Y in step S216), the light source position calculation section 350 determines whether or not the effective pixel is positioned in the second determination area based on the coordinate value of the effective pixel (step S226). When the light source position calculation section 350 has determined that the effective pixel is positioned in the second determination area (Y in step S226), the light source position calculation section 350 performs the process in the steps S220 to S224. When the light source position calculation section 350 has determined that the effective pixel is not positioned in the second determination area (N in step S226), the light source position calculation section 350 determines whether or not all effective pixels have been processed without adding a value to the register (step S212).

When the light source position calculation section 350 has determined that all effective pixels have been processed (Y in step S212), the light source position calculation section 350 determines whether or not data relating to the two determination areas has been acquired (step S228). When the light source position calculation section 350 has determined that data relating to the two determination areas has been acquired (Y in step S228), the light source position calculation section 350 divides the sum of the values stored in the register RX1 by the sum of the values stored in the register RC1 to calculate the X component X1 of the center-of-gravity coordinated of the first determination area, divides the sum of the values stored in the register RY1 by the sum of the values stored in the register RC1 to calculate the Y component Y1 of the center-of-gravity coordinated of the first determination area, divides the sum of the values stored in the register RX2 by the sum of the values stored in the register RC2 to calculate the X component X2 of the center-of-gravity coordinated of the second determination area, and divides the sum of the values stored in the register RY2 by the sum of the values stored in the register RC2 to calculate the Y component Y2 of the center-of-gravity coordinated of the second determination area. The light source position calculation section 350 outputs the center-of-gravity coordinates (X1, Y1) of the first determination area and the center-of-gravity coordinates (X2, Y2) of the second determination area to the indication position calculation section 360 (step S232).

When the light source position calculation section 350 has determined that data relating to the two determination areas has not been acquired (i.e., only data relating to the first determination area has been acquired) (N in step S228), the light source position calculation section 350 performs an out-of-range setting which indicates that the controller 16 is directed in an area outside the detection range (step S234), and outputs the setting information to the indication position calculation section 360 (step S236).

When the light source position calculation section 350 has output the data to the indication position calculation section 360, the light source position calculation section 350 initializes each register and the determination areas (step S238). The process in the steps S200 to S238 is repeated each time the image sensor 18 is initialized, and a first effective pixel of the next frame is output from the pixel FIFO 340.

5. Configuration of Light-Emitting Section

The details of the configuration of the light-emitting section according to this embodiment are described below.

5-1. Noise Prevention by Shielding Section

Figure 10A:
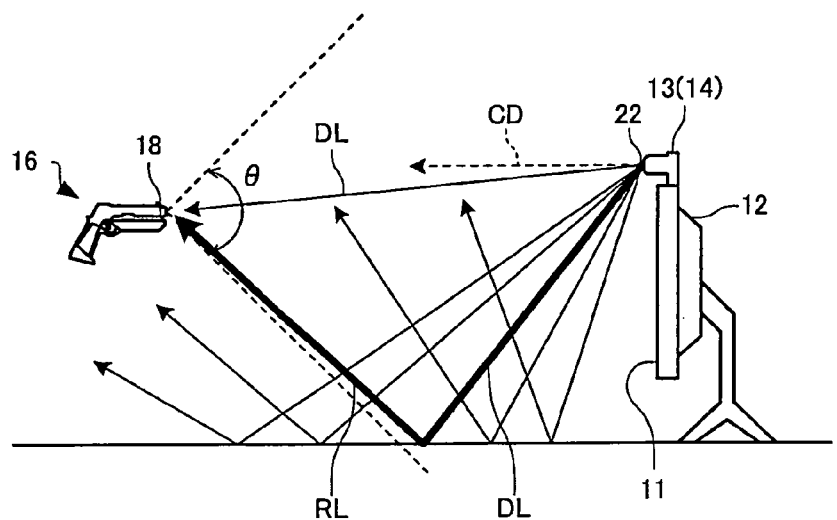
FIGS. 10A and 10B are diagrams illustrating an example of the principle according to one embodiment of the invention.

FIG. 10A is a side view showing a state in which the controller 16 is directed toward the display screen 11. In this embodiment, each of the light-emitting sections 13 and 14 includes a light source 22 which emits infrared light that has a certain directivity and travels in a direction within a given range so that the image sensor 18 can receive the infrared light from the light-emitting sections 13 and 14 when the controller 16 and the light-emitting sections 13 and 14 have a positional relationship within a predetermined range. Specifically, each of the light-emitting sections 13 and 14 causes the light source 22 to emit infrared light so that the infrared light travels in a travel direction within a given range with respect to a center direction CD which is the direction of the light source 22. The center direction of the light source 22 may be a center luminous intensity direction (maximum luminous intensity direction) of the light source 22, for example.

As shown in FIG. 10A, when forming the game system 10 in a room or the like, an object (e.g., mirror or glass table) which reflects the infrared light from the light source 22 may exist between the light source 22 and the image sensor 18. Since the light from the light source 22 travels in a direction within a given range, reflected light RL having the same wavelength and intensity as direct light DL from the light source 22 may occur at a position differing from the position of the light source 22 (e.g., reflecting surface such as mirror or glass table). If the image sensor 18 receives the reflected light RL, an accurate indication position cannot be calculated due to the reflected light RL as noise.

Figure 11A:
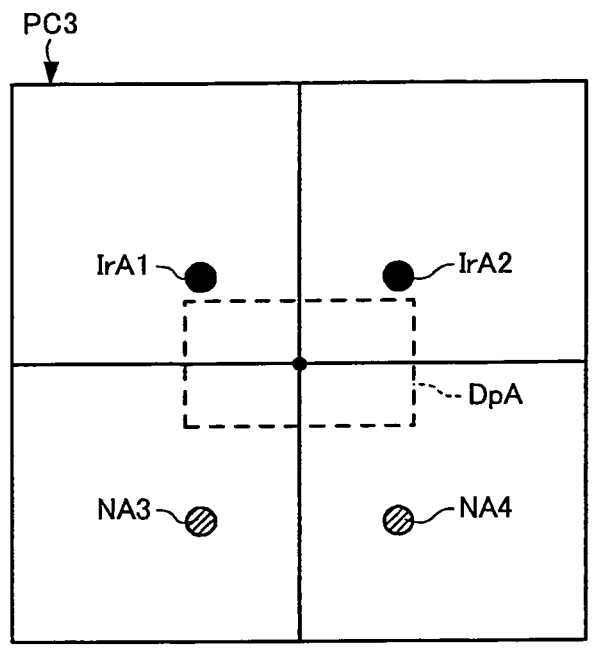
FIGS. 11A and 11B are diagrams illustrating image examples acquired according to one embodiment of the invention.

FIG. 11A shows an image PC3 acquired by the image sensor 18 in the state shown in FIG. 10A. In the state shown in FIG. 10A, since the image sensor 18 receives the direct light DL from the light sources 22 and the reflected light RL, noise areas NA3 and NA4 corresponding to the reflected light RL occur under the infrared light source areas IrA1 and IrA2 corresponding to the light sources 22, as shown in FIG. 11A.

Figure 11B:
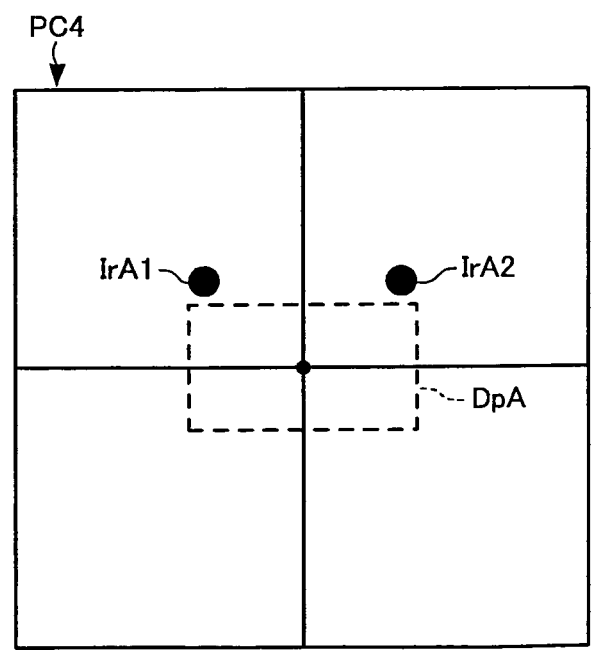

In this embodiment, as shown in FIG. 11B, the reflected light RL which occurs below the light-emitting sections 13 and 14 is prevented by providing a shielding section 24 which shields light that travels downward from the light source 22 (light-emitting sections 13 and 14). Specifically, the shielding section 24 is provided at a position at which the direct light DL from the light source 22 is prevented from traveling in the direction in which the reflected light RL that enters the image sensor 18 occurs when the light source 22 (light-emitting sections 13 and 14) and the image sensor 18 (controller 16) have a given reference positional relationship. Therefore, the image sensor 18 receives the direct light DL from the light source 22 and does not receive the reflected light RL when the light source 22 (light-emitting sections 13 and 14) and the image sensor 18 (controller 16) have a given reference positional relationship.

In this embodiment, the light source 22 and the image sensor 18 have the reference positional relationship when the controller 16 is held in the above-mentioned reference position, is located at a reference position away from the light-emitting sections 13 and 14 by four meters, and is positioned in a reference direction in which the controller 16 is directed toward the light source 22. The position, direction, size, shape, and the like of the shielding section 24 are determined so that the reflected light RL does not enter within the angle of view theta (Light-reception range) of the image sensor 18 when the light source 22 and the image sensor 18 have the reference positional relationship.

In this embodiment, the position, direction, size, shape, and the like of the shielding section 24 are determined provided that a position at the maximum distance from the light source 22 at which the image sensor 18 can obtain a quantity of light (luminous intensity or luminous flux) necessary for the game system 10 to calculate an accurate indication position from the light source 22 is set to be the reference position and an average (basic) direction of the controller 16 when the player plays a game while holding the controller 16 toward the display screen 11 is set to be the reference direction. In the example shown in FIG. 10B, a plate-shaped shielding section 24 is provided under the light source 22 at a position near the light source 22 to protrude forward from the front surface of each of the light-emitting sections 13 and 14. Therefore, light which travels downward from the light source 22 in a direction within a predetermined angle phi can be shielded by the shielding section 24.

Figure 10B:
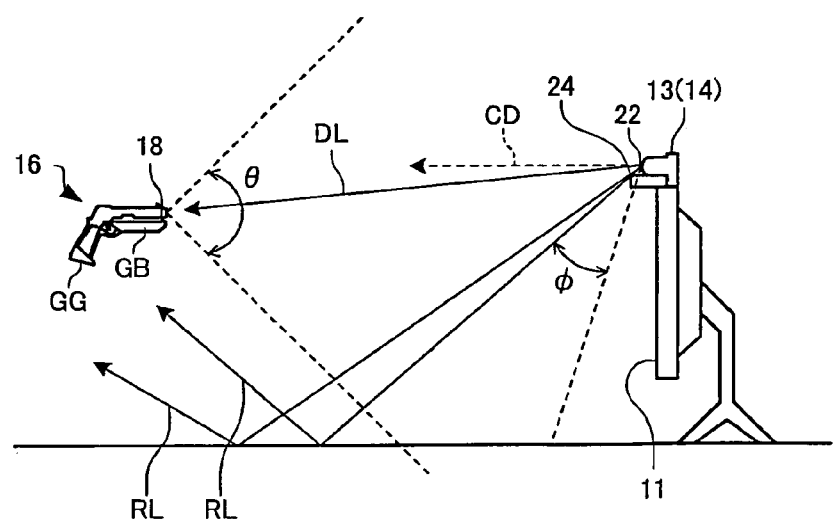

FIG. 11B shows light received by the image sensor 18 (i.e., image data stored in image data area PA) in the state shown in FIG. 10B. In the state shown in FIG. 10B, since the image sensor 18 receives the direct light DL from the light sources 22 but does not receive the reflected light RL, the noise areas NA3 and NA4 corresponding to the reflected light RL do not occur under the infrared light source areas IrA1 and IrA2 corresponding to the light sources 22, as shown in FIG. 11B.

Therefore, according to this embodiment, the reflected light RL which enters the image sensor 18 does not occur when the controller 16 is directed toward the display screen 11 within a game play range in which the distance between the light-emitting sections 13 and 14 and the controller 16 is four meters or less, as shown in FIG. 10B. The reflected light RL also occurs in FIG. 10B. However, the reflected light RL does not enter the image sensor 18 unless the controller 16 is positioned outside the game play range.

Note that the reference positional relationship is not limited to the above-mentioned example. Various positional relationships may be set. For example, the reference position may be set depending on the intensity of the light source 22 (i.e., distance at which the quantity of light and the like necessary for calculating an accurate indication position are ensured), the luminous intensity distribution curve, and the beam angle (i.e., diffusion range of predetermined quantity of light). The reference direction may be set depending on the application of the indication position calculation system. Specifically, the reference direction may be appropriately set depending on the basic position of an operator (player P) who holds an indicator (controller 16) with respect to the indication plane (display screen 11). For example, when applying the indication position calculation system according to this embodiment to a presentation system, the operator who operates the indicator is rarely positioned perpendicularly to the indication plane (e.g., screen), but is generally positioned diagonally in front of the indication plane. The operator generally directs the indicator toward the indication plane (light source) disposed above the operator. In this case, a direction upward from a position diagonally in front of the indication plane may be set to be the reference direction.

5-2. Details of Shielding Section

Figure 12:
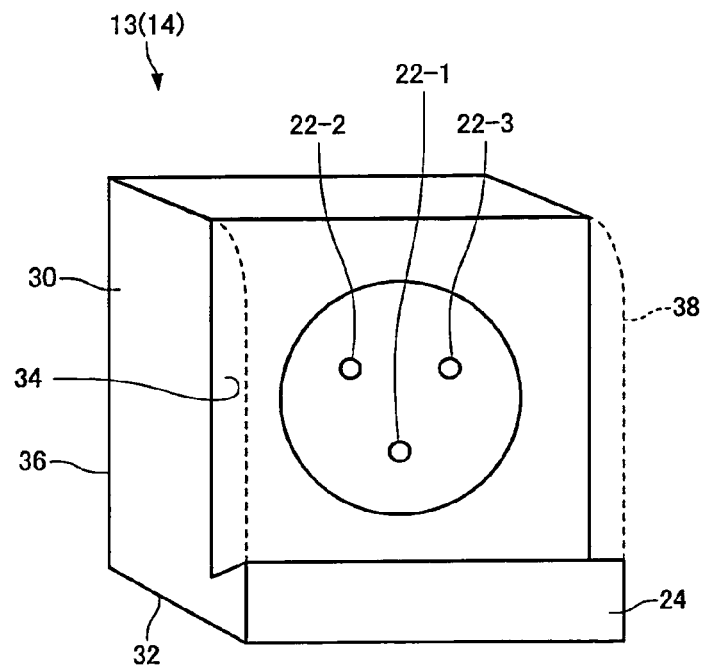
FIG. 12 is a diagram schematically showing an example of the appearance of a light-emitting section according to one embodiment of the invention.

FIG. 12 is a perspective view of the light-emitting section 13 (14) of the light-emitting unit 15 according to this embodiment. In this embodiment, the light-emitting section 13 (14) is disposed in a state in which a bottom surface 32 of a housing 30 is secured on the top surface of the display section 12. The housing 30 has a front surface 34 and a back surface 36. Three LED light sources 22-1 to 22-3 which emit infrared light from the front surface 34 are provided on the front surface 34. In this embodiment, the light sources 22-1 to 22-3 are disposed to form vertices of an inverted triangle when viewed from the travel direction of light emitted from the light sources 22-1 to 22-3. Therefore, even if the distance between the light sources 22-1 to 22-3 and the image sensor 18 increases, the image sensor 18 can reliably receive the infrared light from the light sources 22-1 to 22-3 as light having a predetermined area.

A cover 38 which allows the infrared light from the light sources 22-1 to 22-3 to pass through is provided on the front surface 34 of the housing 30 to protect the light sources 22-1 to 22-3. The shielding section 24 which protrudes from the front surface 34 is provided at the lower end of the front surface 34 of the housing 30 (i.e., below the light sources 22-1 to 22-3). In this embodiment, the shielding section 24 is integrally formed with the housing 30. A material which does not allow the infrared light from the light sources 22-1 to 22-3 to pass through is used for the shielding section 24. Therefore, light emitted from the light sources 22-1 to 22-3 downward in a predetermined degrees of angle or less from the horizontal can be shielded by the shielding section 24.

Figure 13:
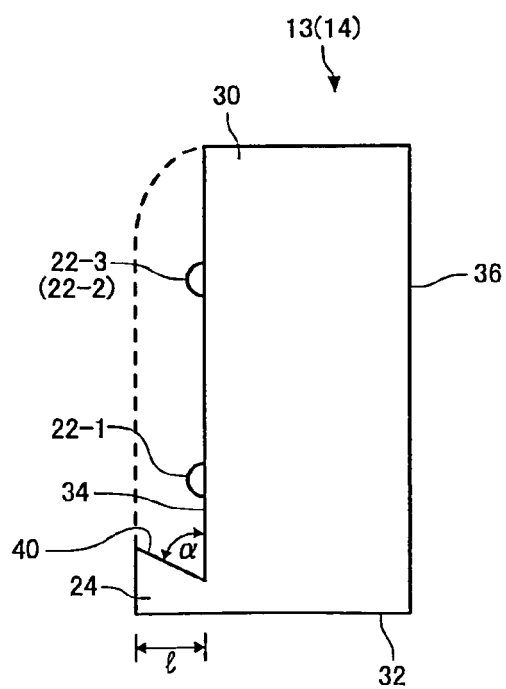
FIG. 13 is a diagram schematically showing an example of the appearance of a light-emitting section according to one embodiment of the invention.

FIG. 13 is a side view of the light-emitting section 13 (14) shown in FIG. 12. In this embodiment, an angle alpha formed by a shielding surface 40 (i.e., top surface) of the shielding section 24 and the front surface 34 of the housing 30 is an acute angle, as shown in FIG. 13. Therefore, a protrusion distance l of the shielding section 24 from the front surface 34 necessary for shielding light which travels in a direction within a predetermined range can be reduced as compared with the case where the angle alpha is a right angle or a obtuse angle. In this embodiment, the angle alpha is set at 70 degrees, and the protrusion distance l is set at 7 mm. According to the example shown in FIG. 13, protrusion of the light-emitting section 13 (14) can be prevented and the size of the light-emitting section 13 (14) can be reduced even if the shielding section 24 is provided.

5-3. Noise Prevention Due to Direction of Light Source

The above description has been given taking an example in which the reflected light as noise is prevented by providing the shielding section 24 on the front surface of each of the light-emitting sections 13 and 14 to shield light which travels downward from the light sources 22-1 to 22-3. Note that the reflected light as noise may be prevented by preventing light from traveling downward from the light sources 22-1 to 22-3 by adjusting the directions of the light sources 22-1 to 22-3 disposed in the light-emitting sections 13 and 14. Specifically, the center direction CD of the light sources 22-1 to 22-3 may be adjusted to a direction in which the direct light DL from the light source 22 is prevented from traveling in the direction in which the reflected light RL that enters the image sensor 18 occurs when the light source 22 (light-emitting sections 13 and 14) and the image sensor 18 (controller 16) have a given reference position relationship.

Figure 14:
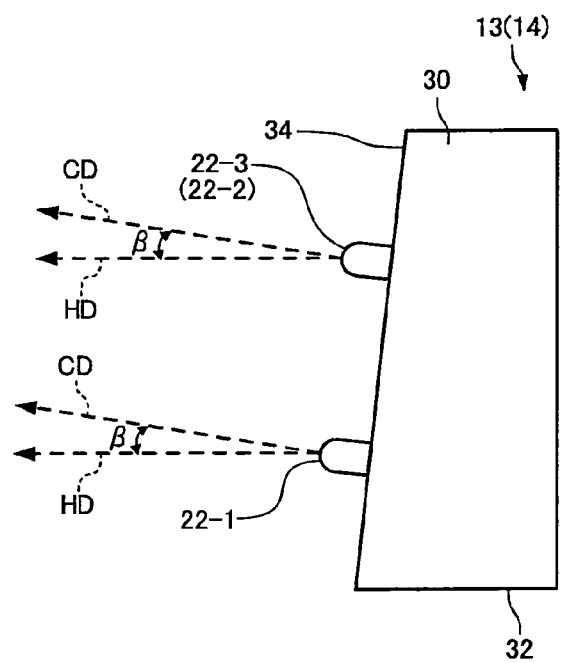
FIG. 14 is a diagram schematically showing an example of the appearance of a light-emitting section according to one embodiment of the invention.

FIG. 14 shows an example of the light-emitting section 13 (14) of which the light sources 22-1 to 22-3 are disposed so that the center direction CD of the light sources 22-1 to 22-3 faces upward by beta degrees with respect to a horizontal direction (direction normal to the display screen 11 of the display section 12) HD when the light-emitting section 13

(14) is disposed in a state in which the bottom surface 32 of the housing 30 is secured on the top surface of the display section 12. In the example shown in FIG. 14, direct light from the light source 22 is prevented from traveling in a direction in which reflected light enters the image sensor 18 by adjusting the center direction CD of the light sources 22-1 to 22-3 upward by beta degrees. Therefore, occurrence of reflected light which serves as noise under the light sources 22-1 to 22-3 can be prevented in the same manner as in the example shown in FIG. 13.

6. Light-Reception Range of Image Sensor

A Light-reception range in which the image sensor 18 can receive light from the light sources 22-1 to 22-3 in the game system 10 according to this embodiment is described below. In this embodiment, three light sources 22-1 to 22-3 which differ in center direction are disposed in the light-emitting section 13 (14) so that the image sensor 18 can receive infrared light from the light-emitting sections 13 and 14 when the controller 16 and the light-emitting sections 13 and 14 have a positional relationship within a specific range.

Figure 15A:
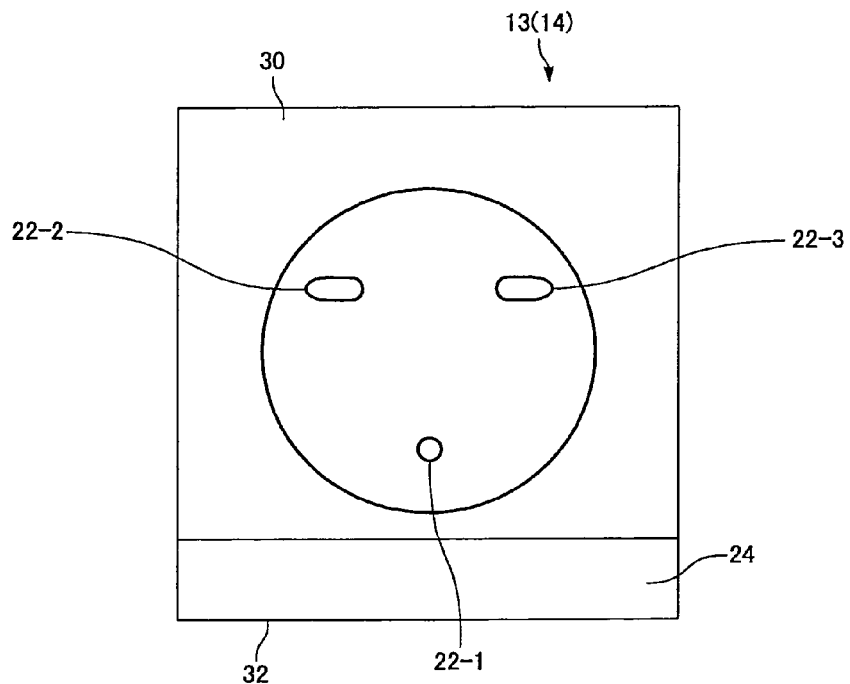
FIGS. 15A and 15B are diagrams schematically showing an example of the appearance of a light-emitting section according to one embodiment of the invention.
Figure 15B:
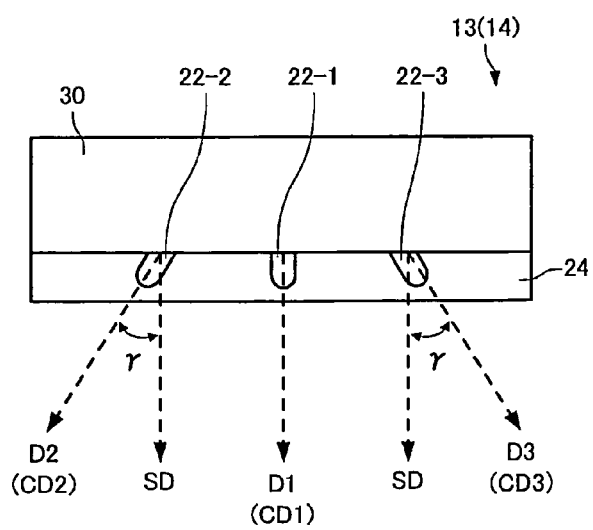

FIG. 15A is a front view of the light-emitting section 13 (14) according to this embodiment, and FIG. 15B is a top view of the light-emitting section 13 (14). As shown in FIG. 15A, the three light sources 22-1 to 22-3 of the light-emitting section 13 (14) according to this embodiment are disposed to form vertices of an inverted triangle. As shown in FIG. 15B, the lowermost first light source 22-1 is disposed so that a center direction CD1 of the light source 22-1 coincides with a first direction D1 which is a reference direction SD of the light-emitting section 13 (14).

In the light-emitting section 13 (14) according to this embodiment, the reference direction SD is the front direction of the display screen 11 which is the basic direction of the player P who holds the controller 16. Specifically, a direction parallel to the direction normal to the display screen 11 of the display section 12 when the light-emitting section 13 (14) is disposed in a state in which the bottom surface 32 of the housing 30 is secured on the top surface of the display section 12 is set to be the reference direction SD. In this embodiment, a predetermined range around the front direction of the display screen 11 (i.e., basic direction of the player P) in which light travels from the first light source 22-1 may be set to be the Light-reception range of the image sensor 18.

Since the image sensor 18 successively outputs the light-reception information relating to each pixel while scanning the pixels of the acquired image PC from the lower row to the upper row, the image sensor 18 outputs the light-reception information relating to a pixel in the image PC corresponding to the lowermost first light source 22-1 prior to pixels corresponding to the light sources 22-2 and 22-3. Therefore, a pixel corresponding to the first light source 22-1 is determined to be a first effective pixel which satisfies a given condition. In this embodiment, the maximum luminous intensity direction of the first light source 22-1 corresponding to the first effective pixel is set to be the front direction of the display screen 11 (basic direction of the player P) by causing the center direction CD1 of the first light source 22-1 to coincide with the front direction of the display screen 11. According to this embodiment, when the player P directs the controller 16 toward the display screen 11 along the front direction of the display screen 11, a first effective pixel can be reliably determined by light which travels from the lowermost first light source 22-1.

As shown in FIG. 15B, the second light source 22-2 positioned on the left when viewed from the front surface (light travel direction) is disposed so that a center direction CD2 of the light source 22-2 coincides with a second direction D2 which differs from the reference direction SD by an angle gamma of 90 degrees or less. In this embodiment, the second light source 22-2 is disposed so that the center direction CD2 differs from the reference direction SD by 60 degrees toward the left when viewed from the front surface. Therefore, the image sensor 18 can receive light which travels from the second light source 22-2 within a left range with respect to the front direction of the display screen 11.

As shown in FIG. 15B, the third light source 22-3 positioned on the right when viewed from the front surface (light travel direction) is disposed so that a center direction CD3 of the light source 22-3 coincides with a third direction D3 which is line-symmetrical with the second direction D2 with respect to the reference direction SD as the symmetry axis. In this embodiment, the third light source 22-3 is disposed so that the center direction CD3 differs from the reference direction SD by 60 degrees toward the right when viewed from the front surface. Therefore, the image sensor 18 according to this embodiment can receive light which travels from the third light source 22-3 within a right range with respect to the front direction of the display screen 11.

In the game system 10 according to this embodiment, since the player P moves along a floor (horizontal plane), it is preferable that the second direction D2 and the third direction D3 be parallel to the horizontal plane and differ in direction. When it is necessary to prevent light emitted downward from the light sources 22-1 to 22-3 from being reflected, the center directions CD1 to CD3 of the light sources 22-1 to 22-3 may be adjusted upward from the horizontal direction HD by about five degrees.

7. Functional Blocks

Figure 16:
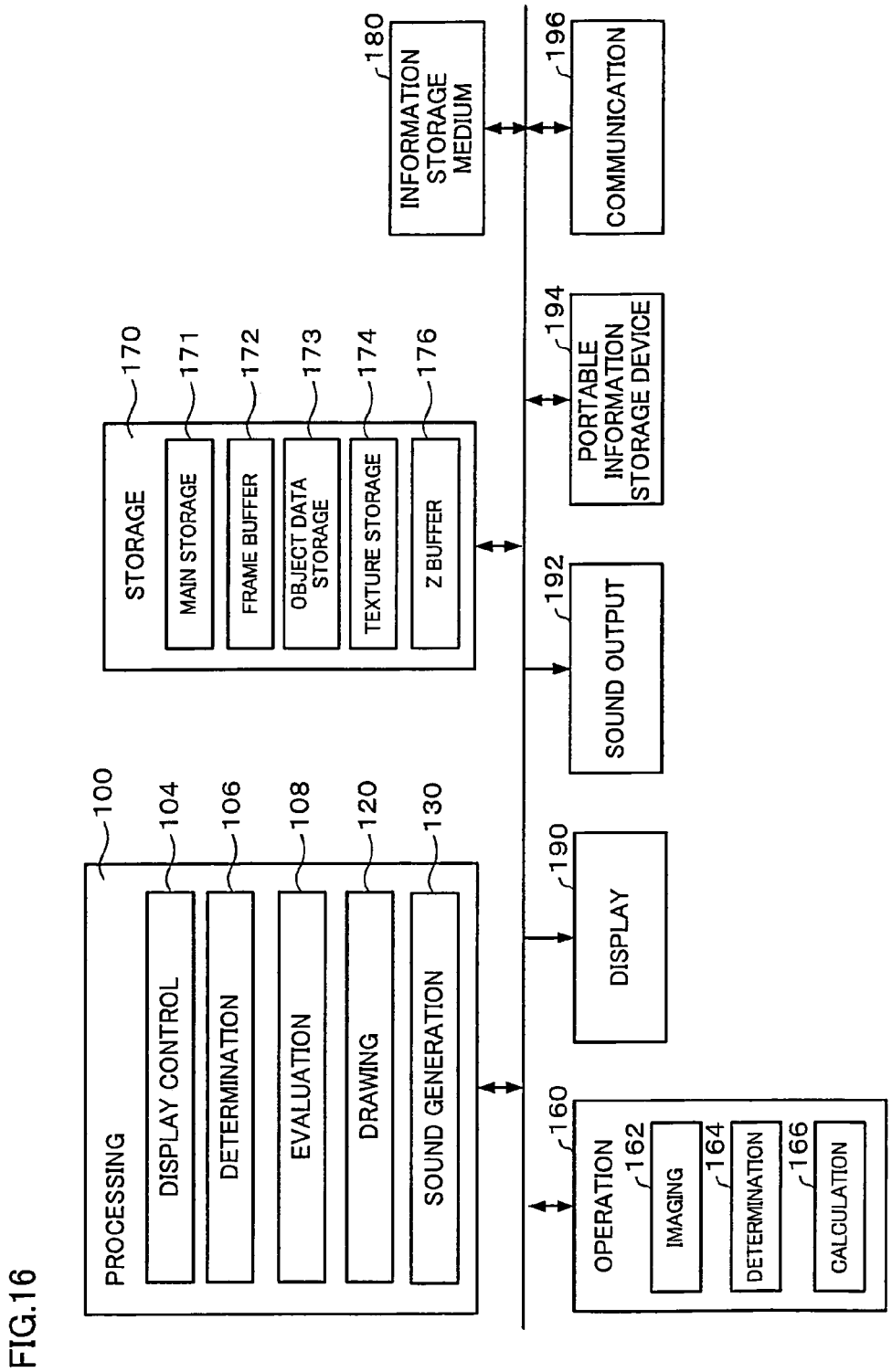
FIG. 16 is a functional block diagram showing an example of an indication position calculation system according to one embodiment of the invention.

The configuration of the indication position calculation system (game system) according to this embodiment is described below with reference to FIG. 16. FIG. 16 is a functional block diagram showing an example of the indication position calculation system according to this embodiment. The indication position calculation system according to this embodiment may have a configuration in which some of the elements (sections) shown in FIG. 16 are omitted.

An operation section 160 allows a player to input operation data. In this embodiment, the operation section 160 may be an indicator (controller, shooting device, or pointing device) configured so that the player can arbitrarily change the position and the direction of the operation section 160 while holding the operation section 160 and directs the operation section 160 toward an arbitrary position on the indication plane such as the display screen 11.

The operation section 160 includes a trigger as an operating section for the player to perform an ON/OFF input. The operation section 160 may include a button, a lever (analog pad), an arrow key, a steering wheel, a microphone, a touch panel display, or the like so that various types of operation data can be input.

The operation section 160 includes an imaging section 162, a determination section 164, and a calculation section 166.

The imaging section 162 may be implemented by an image sensor such as a CMOS sensor or a CCD camera. The imaging section 162 successively outputs the light-reception information relating to each pixel from a starting pixel provided on one end of the acquired image to an end pixel provided on the other end of the acquired image. The imaging section 162 may successively output the light-reception information relating to each pixel utilizing a hardware configuration, or may successively output the light-reception information relating to each pixel under software control.

The determination section 164 may be implemented by hardware such as a processor (e.g., CPU, MPU, or DSP) or an ASIC (e.g., gate array) and a program. The determination section 164 determines whether or not each pixel satisfies a given condition based on the light-reception information relating to each pixel successively output from the imaging section 162.

The calculation section 166 may be implemented by hardware such as a processor (e.g., CPU, MPU, or DSP) or an ASIC (e.g., gate array) and a program. When the pixels which satisfy the given condition are pixel corresponding to the light-emitting sections 13 and 14, the calculation section 166 performs position calculations based on the identification information relating to the pixels which satisfy the given condition to calculate the indication position of the operation section 160.

The determination section 164 and the calculation section 166 may be integrally implemented by one processor or the like. The determination section 164 and the calculation section 166 may be implemented by the function of a processing section 100 instead of providing the determination section 164 and the calculation section 166 in the operation section 160.

A storage section 170 serves as a work area for the processing section 100, a communication section 196, and the like. The function of the storage section 170 may be implemented by a RAM (VRAM) or the like. The storage section 170 according to this embodiment includes a main storage section 171 used as a work area, a frame buffer 172 in which the final display image and the like are stored, an object data storage section 173 in which model data relating to an object is stored, a texture storage section 174 in which the texture for each piece of object data is stored, and a Z buffer 176 in which a Z value is stored when generating an image of an object. Note that the storage section 170 may have a configuration in which some of these sections are omitted.

An information storage medium 180 (computer-readable medium) stores a program, data, and the like. The function of the information storage medium 180 may be implemented by an optical disk (CD or DVD), a magneto-optical disk (MO), a magnetic disk, a hard disk, a magnetic tape, a memory (ROM), or the like.

A program (data) for causing the processing section 100 to perform various processes according to this embodiment is stored in the information storage medium 180. Specifically, a program which causes a computer to function as each section according to this embodiment (program which causes a computer to perform the process of each section) is stored in the information storage medium 180.

A display section 190 outputs an image generated according to this embodiment. The function of the display section 190 may be implemented by a CRT, an LCD, a touch panel display, or the like. In this embodiment, a light-emitting unit 15 for calculating the relative positions of the operation section 160 and the display screen of the display section 190 is provided in or around the display screen of the display section 190. In this embodiment, an infrared LED which emits invisible light is used as the light source of the light-emitting unit 15.

A sound output section 192 outputs sound generated according to this embodiment. The function of the sound output section 192 may be implemented by a speaker, a headphone, or the like.

A portable information storage device 194 stores player's personal data, game save data, and the like. As the portable information storage device 194, a memory card, a portable game device, and the like can be given.

The communication section 196 performs various types of control for communicating with the outside (e.g. host device or another image generation system). The function of the communication section 196 may be implemented by hardware such as a processor or a communication ASIC, a program, or the like.

The program (data) for causing a computer to function as each section according to this embodiment may be distributed to the information storage medium 180 (storage section 170) from an information storage medium included in a host device (server) through a network and the communication section 196. Use of the information storage medium of the host device (server) is also included within the scope of the invention.

The processing section 100 (processor) performs a game process, an image generation process, a sound generation process, and the like based on operation data from the operation section 160, a program, and the like. The game process includes starting a game when game start conditions have been satisfied, proceeding with a game, disposing an object such as a character or a map, displaying an object, calculating game results, finishing a game when game end conditions have been satisfied, and the like. The processing section 100 performs various processes using the storage section 170 as a work area. The function of the processing section 100 may be implemented by hardware such as a processor (e.g. CPU or DSP) or an ASIC (e.g. gate array) and a program.

The processing section 100 according to this embodiment includes a display control section 104, a determination section 106, an evaluation section 108, a drawing section 120, and a sound generation section 130. Note that the processing section 100 may have a configuration in which some of these sections are omitted.

The display control section 104 performs a display control process on an object displayed on the display section 190. Specifically, the display control section 104 performs the display control process such as generating an object (e.g. character, background, target, car, ball, item, building, tree, pillar, wall, or map), directing the display position of an object, or causing an object to disappear. Specifically, the display control section 104 performs the display control process such as registering a generated object in an object list, transferring the object list to the drawing section 120 and the like, or deleting a disappeared object from the object list. The display control section 104 displays an object indicating the indication position (impact position) on the display screen 11 based on information relating to the indication position of the operation section 160 on the display screen 11.

The determination section 106 determines the positional relationship between the indication position information relating to the operation section 160 on the display screen 11 of the display section 190 and a target object TO based on an operation input using the operating section (trigger) provided in the operation section 160. Specifically, the determination section 106 determines whether or not the indication position has hit (coincides with or reaches) the display position of the target object TO based on the indication position information when the operation input using the operating section has been received.

The evaluation section 108 evaluates the operation using the operation section 160 based on the hit determination result. In this embodiment, the evaluation section 108 evaluates the operation of the operator by means of score calculation and the like when the target object TO has been hit.

The drawing section 120 performs a drawing process based on the results of various processes (game process) performed by the processing section 100 to generate an image, and outputs the generated image to the display section 190. An image generated by the drawing section 120 may be a twodimensional image or a three-dimensional image. When generating a three-dimensional image, the drawing section 120 performs a geometric process such as coordinate transformation (world coordinate transformation or camera coordinate transformation), clipping, or perspective transformation, and creates drawing data (e.g. primitive surface vertex coordinates, texture coordinates, color data, normal vector, and alpha-value) based on the processing results. The drawing section 120 draws an object (one or more primitives) subjected to perspective transformation (geometric process) in a drawing buffer (buffer which can store image information in pixel units such as a frame buffer or intermediate buffer; VRAM) based on the drawing data (primitive data). This causes an image viewed from a virtual camera (given view point) to be generated in a game space.

The sound generation section 130 performs a sound process based on the results of various processes performed by the processing section 100 to generate game sound such as background music (BGM), effect sound, or voice, and outputs the generated game sound to the sound output section 192.

The image generation system according to this embodiment may be configured as a system dedicated to a single-player mode in which only one player can play a game, or a system which also implements a multi-player mode in which a plurality of players can play a game.

When a plurality of players play a game, a game image and game sound provided to the players may be generated using one terminal, or may be generated by a distributed process using a plurality of terminals (game devices or portable telephones) connected via a network (transmission line or communication line), for example.

The invention is not limited to the above-described embodiments, and various modifications can be made within the scope of the invention. For instance, any term cited together with a different term having a broader meaning or the same meaning at least once in this specification or drawings can be replaced by the different term in any place in this specification and drawings.

The above description has been given taking an example in which the light-emitting unit 15 includes two light-emitting sections 13 and 14 independently provided. Note that the light-emitting unit 15 may be formed by integrating the two light-emitting sections 13 and 14. For example, the light-emitting unit 15 may be formed as an oblong rod-shaped member, and the light-emitting sections 13 and 14 may be disposed on the right and left ends. The distance between the light-emitting sections 13 and 14 may be changed in stages in a direction indicated by an arrow. For example, the distance between the light-emitting sections 13 and 14 may be changed in stages corresponding to monitors ranging from a 20-inch monitor to a 50-inch monitor.

The above description has been given taking an example in which the light source 22 emits infrared light (i.e., invisible light). Note that the light source 22 may emit another type of invisible light or may emit visible light. A light source which emits invisible light and a light source which emits visible light may be provided so that the light sources can be switched. In particular, visible light may be output when the operator indicates the indication plane in order to initialize the positional relationship between the light-emitting section (light source) and the indicator (light-receiving section).

The invention may be applied to various image generation systems. The above embodiments have been described taking an example of applying the invention to a game system. Note that the invention may also applied to an indication position calculation system including a presentation system and the like and an indicator used for an indication position calculation system.

The invention may be applied to various image generation systems such as an arcade game system, a consumer game system, a large-scale attraction system in which a number of players participate, a simulator, a multimedia terminal, a system board which generates a game image, and a portable telephone.

Although only some embodiments of this invention have been described in detail above, those skilled in the art will readily appreciate that many modifications are possible in the embodiments without materially departing from the novel teachings and advantages of this invention. Accordingly, all such modifications are intended to be included within the scope of the invention.

What is claimed is:

1. An indication position calculation system calculating an indication position of an indicator, the indication position calculation system comprising:
    a light-emitting section;
    an imaging section which is provided in the indicator, acquires an image and successively outputs light-reception information of pixels of the acquired image, wherein one of the pixels having the light-reception information output primarily is disposed on a lower side of the image when the indicator is held in a reference position and another one of the pixels having the light-reception information output last is disposed on an upper side of the image when the indicator is held in a reference position;
    a determination section which determines whether or not the pixels are effective pixels satisfying a given condition based on the light-reception information without determining whether the pixels are those corresponding to the light-emitting section; and
    a calculation section which performs position calculations based on identification information of the effective pixels in order to obtain the indication position of the indicator when light received by the effective pixels is included in light emitted from the light-emitting section,
    the calculation section performing the position calculations based on the identification information of a first effective pixel, the first effective pixel being a first one of the effective pixels determined to satisfy the given condition,
    wherein the determination section determines whether or not each of the pixels satisfies the given condition and then determines whether or not each of the pixels satisfies a second condition; and
    wherein the calculation section sets a predetermined area of the image, that is less than an entire area of the image, including the first effective pixel as a determination area, and performs the position calculations based on the identification information of part of the effective pixels included in the determination area,
    the identification information of the effective pixels included in the determination area and satisfying the second condition being differently weighted from the effective pixels included in the determination area but not satisfying the second condition.

2. The indication position calculation system as defined in claim 1 comprising:
    a plurality of the light-emitting sections having a predetermined positional relationship with each other,
    wherein the calculation section sets a predetermined area of the image including the first effective pixel as a first determination area, sets another predetermined area of the image including a second effective pixel which has been primarily determined to satisfy the given condition among the pixels out of the first determination area as a second determination area, and then performs the position calculations based on the identification information of the effective pixels within the first determination area and the second determination area.

3. The indication position calculation system as defined in claim 1,
wherein the calculation section calculates a representative value of the determination area based on the identification information of the effective pixels and then performs the position calculations based on the representative value, while making weight on the identification information of the effective pixels included in the determination area and satisfying the second condition different from weight on the identification information of the effective pixels included in the determination area but not satisfying the second condition.

4. The indication position calculation system as defined in claim 1,
wherein the light-emitting section emits light in a predetermined wavelength band; and
wherein the imaging section has a light reception sensitivity for light including the predetermined wavelength band.

5. The indication position calculation system as defined in claim 1, further comprising:
a shielding section provided in the light-emitting section and shielding part of light from the light-emitting section emitted downward in a predetermined degrees of angle or less from the horizontal.

6. The indication position calculation system as defined in claim 5,
wherein the shielding section is disposed at a position enabling the shielding section to shield part of the light from the light-emitting section emitted downward from the horizontal so that no reflected light from lower space enters the imaging section when the light-emitting section and the imaging section have a given reference positional relationship.

7. The indication position calculation system as defined in claim 1,
wherein the light-emitting section is directed in a direction enabling to prevent light from the light-emitting section from being emitted downward from the horizontal so that no reflected light from lower space enters the imaging section when the light-emitting section and the imaging section have a given reference positional relationship.

8. The indication position calculation system as defined in claim 1, further comprising:
a filter which is provided in the indicator and through which light in the same wavelength band as light from the light-emitting section is allowed to pass toward the imaging section.

9. The indication position calculation system as defined in claim 1, comprising:
a plurality of the light-emitting sections having a predetermined positional relationship with each other,
wherein the calculation section performs the position calculations based on the identification information of the effective pixels corresponding to each of the light-emitting sections.

10. An indicator for an indication position calculation system, the indicator comprising:
an imaging section which acquires an image of a light-emitting section and successively outputs light-reception information of pixels of the acquired image,
a determination section which determines whether or not the pixels are effective pixels satisfying a given condition based on the light-reception information without determining whether the pixels are those corresponding to the light-emitting section; and
a calculation section which performs position calculations based on identification information of the effective pixels in order to obtain an indication position of the indicator when light received by the effective pixels is included in light emitted from the light-emitting section,
the calculation section performing the position calculations based on the identification information of a first effective pixel, the first effective pixel being a first one of the effective pixels determined to satisfy the given condition; and
the imaging section being provided in the indicator held in a reference position when one of the pixels having the light-reception information output primarily is disposed on a lower side of the image and another one of the pixels having the light-reception information output last is disposed on an upper side of the image,
wherein the determination section determines whether or not each of the pixels satisfies the given condition and then determines whether or not each of the pixels satisfies a second condition; and
wherein the calculation section sets a predetermined area of the image, that is less than an entire area of the image, including the first effective pixel as a determination area, and performs the position calculations based on the identification information of part of the effective pixels included in the determination area,
the identification information of the effective pixels included in the determination area and satisfying the second condition being differently weighted from the effective pixels included in the determination area but not satisfying the second condition.

11. A game system calculating an indication position of an indicator, the game system comprising:
a display section which displays an object;
a light-emitting section which has a given positional relationship with the display section;
an imaging section which is provided in the indicator, acquires an image and successively outputs light-reception information of pixels of the acquired image, wherein one of the pixels having the light-reception information output primarily is disposed on a lower side of the image when the indicator is held in a reference position and another one of the pixels having the light-reception information output last is disposed on an upper side of the image when the indicator is held in a reference position;
a determination section which determines whether or not the pixels are effective pixels satisfying a given condition based on the light-reception information without determining whether the pixels are those corresponding to the light-emitting section; and
a calculation section which performs position calculations based on identification information of the effective pixels in order to obtain the indication position of the indicator when light received by the effective pixels is included in light emitted from the light-emitting section, the calculation section performing the position calculations based on the identification information of a first effective pixel, the first effective pixel being a first one of the effective pixels determined to satisfy the given condition, wherein the determination section determines whether or not each of the pixels satisfies the given condition and then determines whether or not each of the pixels satisfies a second condition; and wherein the calculation section sets a predetermined area of the image, that is less than an entire area of the image, including the first effective pixel as a determination area, and performs the position calculations based on the identification information of part of the effective pixels included in the determination area, the identification information of the effective pixels included in the determination area and satisfying the second condition being differently weighted from the effective pixels included in the determination area but not satisfying the second condition.

12. An indication position calculation method comprising:

causing an imaging section provided in an indicator to acquire an image of a light-emitting section and successively output light-reception information of pixels of the acquired image;

causing a determination section to determine whether or not the pixels are effective pixels satisfying a given condition based on the light-reception information without determining whether the pixels are those corresponding to the light-emitting section; and causing a calculation section to perform position calculations based on identification information of the effective pixels in order to obtain an indication position of the indicator when light received by the effective pixels is included in light emitted from the light-emitting section;

the calculation section performing the position calculations based on the identification information of a first effective pixel, the first effective pixel being a first one of the effective pixels determined to satisfy the given condition; and the imaging section being provided in the indicator held in a reference position when one of the pixels having the light-reception information output primarily is disposed on a lower side of the image and another one of the pixels having the light-reception information output last is disposed on an upper side of the image, wherein the determination section determines whether or not each of the pixels satisfies the given condition and then determines whether or not each of the pixels satisfies a second condition; and wherein the calculation section sets a predetermined area of the image, that is less than an entire area of the image, including the first effective pixel as a determination area, and performs the position calculations based on the identification information of part of the effective pixels included in the determination area, the identification information of the effective pixels included in the determination area and satisfying the second condition being differently weighted from the effective pixels included in the determination area but not satisfying the second condition.

\* \* \* \* \*